(12) United States Patent
Taruno et al.

(10) Patent No.: US 10,752,395 B2
(45) Date of Patent: Aug. 25, 2020

(54) DELAMINATABLE CONTAINER

(71) Applicant: KYORAKU CO., LTD., Kyoto (JP)

(72) Inventors: Shinsuke Taruno, Kanagawa (JP);
Tetsuaki Eguchi, Kanagawa (JP);
Yosuke Muroya, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 219 days.

(21) Appl. No.: 16/086,741

(22) PCT Filed: Apr. 10, 2017

(86) PCT No.: PCT/JP2017/014651
§ 371 (c)(1),
(2) Date: Sep. 20, 2018

(87) PCT Pub. No.: WO2017/179529
PCT Pub. Date: Oct. 19, 2017

(65) Prior Publication Data
US 2019/0100344 A1 Apr. 4, 2019

(30) Foreign Application Priority Data

Apr. 15, 2016 (JP) .................. 2016-082447
Jun. 3, 2016 (JP) .................. 2016-112186
Sep. 30, 2016 (JP) .................. 2016-193508

(51) Int. Cl.
| | | |
|---|---|---|
| *B65D 1/02* | (2006.01) | |
| *F16K 24/06* | (2006.01) | |
| *B65D 23/02* | (2006.01) | |
| *B65D 41/04* | (2006.01) | |
| *B65D 77/06* | (2006.01) | |
| *B65D 77/22* | (2006.01) | |
| *B65D 83/00* | (2006.01) | |
| *B65D 85/72* | (2006.01) | |

(52) U.S. Cl.
CPC ............ *B65D 1/0215* (2013.01); *B65D 1/02* (2013.01); *B65D 1/0246* (2013.01); *F16K 24/06* (2013.01); *B65D 23/02* (2013.01); *B65D 41/0442* (2013.01); *B65D 77/06* (2013.01); *B65D 77/225* (2013.01); *B65D 83/0055* (2013.01); *B65D 85/72* (2013.01)

(58) Field of Classification Search
CPC .. B65D 83/0055; B65D 1/0215; B65D 77/06; B65D 85/72; B65D 23/02; B65D 1/0246; B65D 41/0442; B65D 77/225; B65D 1/32; B65D 1/023; B65D 1/0276; B65D 2205/025; B65D 47/0838; B65D 47/18; B65D 83/0061; B65D 47/2056; C07C 41/30; C07C 43/23

See application file for complete search history.

(56) References Cited

U.S. PATENT DOCUMENTS

| | | |
|---|---|---|
| 2011/0252971 A1 | 10/2011 | Ono et al. |
| 2014/0190992 A1 | 7/2014 | Kuwagaki et al. |
| 2015/0083950 A1 | 3/2015 | Okiyama |
| 2016/0052661 A1 | 2/2016 | Furusawa et al. |
| 2016/0137390 A1 | 5/2016 | Wochele |
| 2017/0029157 A1 | 2/2017 | Taruno et al. |
| 2017/0036802 A1 | 2/2017 | Taruno |
| 2018/0178940 A1* | 6/2018 | Taruno .................. B65D 23/02 |

FOREIGN PATENT DOCUMENTS

| | | |
|---|---|---|
| AU | 581618 B2 | 3/1989 |
| CN | 102239351 A | 11/2011 |
| JP | H04-267727 A | 9/1992 |
| JP | H05-124675 A | 5/1993 |
| JP | 2004-149196 A | 5/2004 |
| JP | 2006-335398 A | 12/2006 |
| JP | 2009-179403 A | 8/2009 |
| JP | 2013-35557 A | 2/2013 |
| JP | 2013-226281 A | 11/2013 |
| JP | 2015-198908 A | 11/2015 |
| JP | 2015-227203 A | 12/2015 |
| JP | 2015-227206 A | 12/2015 |
| WO | 2014/157258 A1 | 10/2014 |
| WO | 2014/202278 A1 | 12/2014 |
| WO | 2015/080015 A1 | 6/2015 |
| WO | 2015/080017 A1 | 6/2015 |
| WO | 2015/152337 A1 | 10/2015 |

OTHER PUBLICATIONS

International Search Report dated Jun. 13, 2017 of corresponding International Application No. PCT/JP2017/014651; 11 pgs.
Office Action dated Feb. 25, 2020 in corresponding Chinese Application No. 201780023478.8; 18 pages including English-language translation.
Chinese Office Action dated Sep. 18, 2019, in connection with corresponding CN Application No. 201780023478.8 (21 pages, including machine-generated English translation).

* cited by examiner

*Primary Examiner* — Sharon Pregler
(74) *Attorney, Agent, or Firm* — Maier & Maier, PLLC

(57) ABSTRACT

A delaminatable container can promptly introduce the external air into the space between the outer shell and the inner bag after discharging the contents. A delaminatable container includes a container body having an outer shell and an inner bag, the inner bag shrinking as contents decrease; and a valve member to adjust charging/discharging of air between an intermediate space and an external space S of the container body, the intermediate space located between the outer shell and the inner bag. The container body includes a storage portion to store the contents; and a mouth to discharge the contents from the storage portion; the storage portion includes a pillar body; and a shoulder connecting the body and the mouth; the shoulder is provided with a valve housing recess to house the valve member.

5 Claims, 27 Drawing Sheets

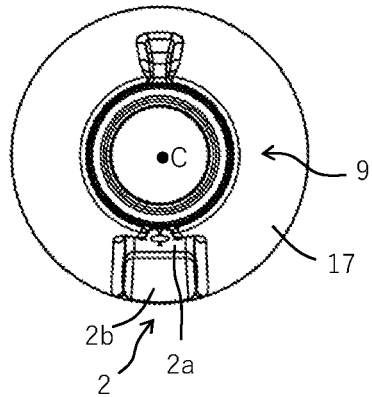
Fig. 2C
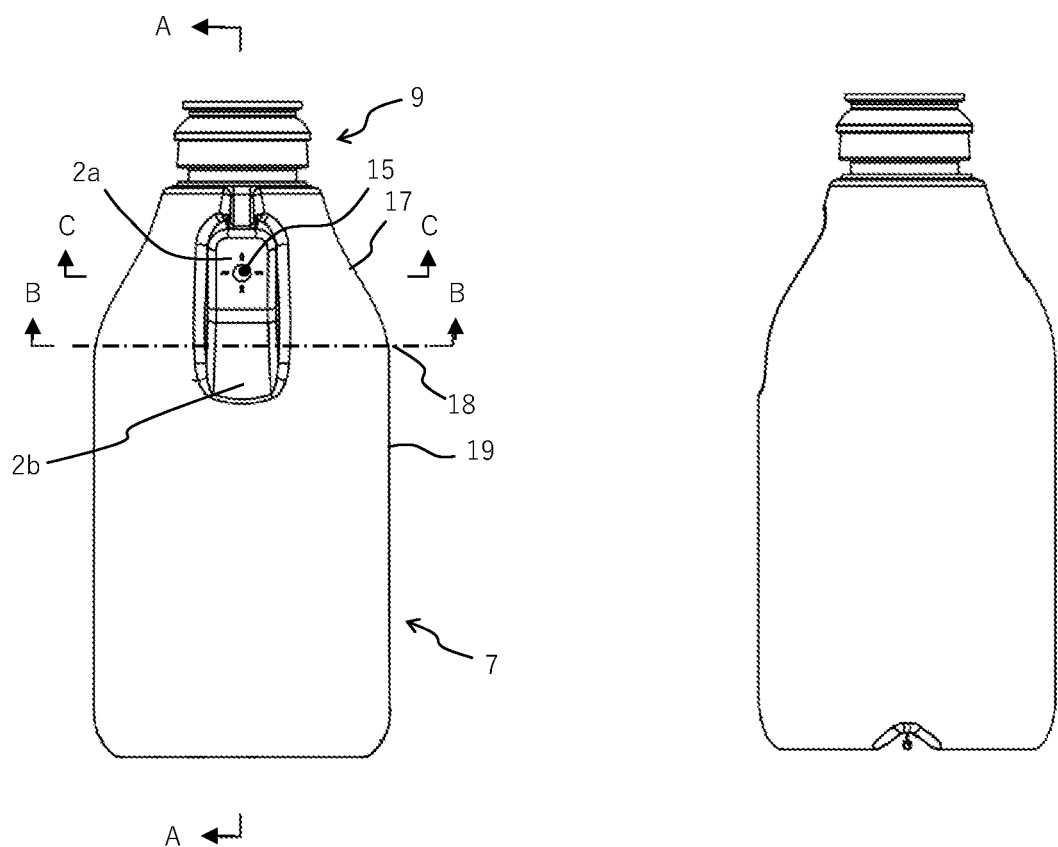
Fig. 2A
Fig. 2B before initial discharge  after initial discharge before insertion of valve member after insertion of valve member and before Initial discharge after initial discharge before insertion of valve member after insertion of valve member and before Initial discharge after initial discharge

DELAMINATABLE CONTAINER

FIELD

The present invention relates to a delaminatable container having an inner bag, the inner bag shrinking upon decrease in the contents.

BACKGROUND

Conventionally, delaminatable containers having an outer shell and an inner bag, the inner bag shrinking upon decrease in the contents, have been known (for example, refer to Patent Literatures 1 to 4).

Regarding the container of the Patent Literature 1, the contents are discharged from the container by compressing the outer shell, and then the initial shape of the outer shell is recovered after discharging the contents.

Regarding the delaminatable container of the Patent Literature 2, a valve member is mounted on the air inlet formed in the outer shell of the container body. This valve member moves relatively with respect to the container body, thereby opening and closing the air inlet.

Further, in the delaminatable container disclosed in Patent Literature 3, a cap valve is built in a cap which is mounted on the mouth of the container body. Regarding the delaminatable container disclosed in Patent Literature 4, the valve is provided at the inner side of the body of the outer shell.

[Patent Literature 1] JP 2015-227206A
[Patent Literature 2] WO/2015/080015
[Patent Literature 3] JP 2013-35557A
[Patent Literature 4] JP H4-267727A

SUMMARY

First Aspect and Second Aspect

However, with the constitution of Patent Literature 1 and Patent Literature 2, the movement of the valve member can be interfered when the valve member is pressed against the outer shell by the inner bag. In a case where the movement of the valve member is interfered, external air would not be introduced into a space between the outer shell and the inner bag via the air inlet, at an appropriate timing after discharging the contents. Accordingly, recovery characteristics of the outer shell can be unsatisfactory.

Third Aspect

Although the constitution with the valve as mentioned above is superior in terms of the discharge characteristics of the contents and recovery characteristics of the outer shell, there was a possibility of valve malfunction.

The present invention has been made by taking the afore-mentioned circumstances into consideration. The first aspect and the second aspect have an object to provide a delaminatable container which can promptly introduce the external air into the space between the outer shell and the inner bag after discharging the contents, and of which outer shell having a superior recovery characteristics. The third aspect has an object to provide a delaminatable container which retains the discharge characteristics of the contents and recovery characteristics of the outer shell, even when a valve is not provided.

The afore-mentioned problems can be solved by at least one of the first, second, and third aspects described hereinafter. The constitution discussed in relation with the first, second, and third aspects can be combined with each other, and a superior effect can be obtained by such combination. The object and the effect of the first aspect can be achieved by the constitution of the first aspect, the object and the effect of the second aspect can be achieved by the constitution of the second aspect, and the object and the effect of the third aspect can be achieved by the constitution of the third aspect.

According to the first aspect of the present invention, provided is a delaminatable container comprising a container body having an outer shell and an inner bag, the inner bag shrinking as contents decrease; and a valve member to adjust charging/discharging of air between an intermediate space and an external space S of the container body, the intermediate space located between the outer shell and the inner bag; wherein: the container body comprises a storage portion to store the contents; and a mouth to discharge the contents from the storage portion; the storage portion comprises a pillar body; and a shoulder connecting the body and the mouth; the shoulder is provided with a valve housing recess to house the valve member; an air inlet to introduce external air into the intermediate space between the outer shell and the inner bag is provided in the valve housing recess; the valve member is mounted on the air inlet; the valve housing recess comprises a basal plane; and a circumferential side surface provided at both sides in a circumferential direction of the basal plane; and the valve housing recess is structured so as not to have a side surface at the body-side; or is structured so that a tilt angle of a body-side side surface provided at the body-side with respect to the basal plane is 45 degrees or less.

In the technique disclosed in Patent Literature 1, the whole circumference of the basal plane of the valve housing recess is surrounded with a side wall. Accordingly, at a portion adjacent to the air inlet, the outer shell and the inner bag have a shape resembling laminated bowls. This caused difficulty for the inner bag to separate from the outer shell, thereby giving rise to a case where the inner bag presses the valve member towards the outer shell. On the other hand, in the present invention, the basal plane of the valve housing recess is smoothly extended to the outer periphery of the storage portion at the body-side. Accordingly, the inner bag is more less restrained by the outer shell at the body-side of the valve housing recess. This allows easier release of the inner bag from the outer shell, thereby achieving prompt instruction of the external air into the space between the outer shell and the inner bag, resulting in improvement in recovery characteristics of the outer shell.

Hereinafter, various embodiments of the present invention will be described. The embodiments described hereinafter can be combined with each other.

Preferably, the valve housing recess is provided so as to extend from the shoulder and reach a boundary of the body and the shoulder.

Preferably, when a thickness at a position adjacent to the valve housing recess along the boundary is taken as T1, and a thickness at a central position in a direction along the boundary is taken as T2, a relation of $T2/T1 \geq 1.2$ is satisfied.

Preferably, a relation of $T2/T1 \geq 1.3$ is satisfied.

Preferably, a tilt angle of the circumferential side surface with respect to the basal plane at a position where the air inlet is provided is larger than a tilt angle of the body-side side surface with respect to the basal plane.

Preferably, the tilt angle of the circumferential side surface with respect to the basal plane is 50 degrees or larger.

Preferably, a highest portion of the circumferential side surface is positioned at a body-side of a position where the air inlet is provided.

Preferably, the valve housing recess is provided with a substantially rectangular shape.

Preferably, the valve member comprises: a shaft inserted in the air inlet; a lid arranged at the intermediate space-side of the shaft and having a larger cross-sectional area than the shaft; and a locking portion arranged at the external space-side of the shaft and preventing the valve member from coming into the intermediate space.

According to the second aspect of the present invention, provided is a delaminatable container comprising a container body having an outer shell and an inner bag, the inner bag shrinking as contents decrease; and a valve member to adjust charging/discharging of air between an intermediate space and an external space S of the container body, the intermediate space located between the outer shell and the inner bag; wherein: the container body comprises a storage portion to store the contents; and a mouth to discharge the contents from the storage portion; the outer shell comprises an air inlet connecting the intermediate space and the external space at the storage portion; the valve member comprises a cylinder body having a cavity to connect the external space and the intermediate space; and a moving body arranged to move in the cavity; the cylinder body comprises a first stopper to restrict movement of the moving body towards the external space-side by locking the moving body; and the valve member blocks air flow through the cavity when the moving body is in contact with the first stopper.

According to the present invention, the interaction between the valve member and the inner bag can be suppressed since the valve member is provided with a cylinder body having a cavity which connects the external space with the intermediate space, and with a moving body which is arranged so as to move within the cavity. As a result, external air is promptly introduced into the space between the outer shell and the inner bag via the air inlet after discharging the contents.

Hereinafter, various embodiments of the present invention will be described. The embodiments described hereinafter can be combined with each other.

Preferably, the valve member moves towards the intermediate space from a condition where the moving body is in contact with the first stopper, by maintaining a condition where the moving body is positioned at the external space-side with respect to a tip of the cylinder body at the intermediate space-side.

Preferably, the cylinder body further comprises a second stopper to restrict movement of the moving body towards the intermediate space-side by locking the moving body.

Preferably, the moving body is positioned at the external space-side with respect to the tip of the cylinder body even in a condition where the moving body is locked by the second stopper.

Preferably, the cylinder body has the first stopper at a surface surrounding the cavity; and has the second stopper at the external space-side with respect to the first stopper.

Preferably, the moving body comprises a pillar shaft; the shaft moving along the cavity of the cylinder body.

Preferably, the moving body comprises: a locking portion arranged at the external space-side of the shaft and contacting the second stopper; and a bulged portion arranged at the intermediate space-side of the shaft and contacting the first stopper.

Preferably, the cylinder body comprises: a cylinder body shaft arranged in the air inlet; a cylinder body locking portion arranged at the external space-side of the cylinder body shaft and preventing the cylinder body from coming into the intermediate space; and a cylinder body bulge arranged at the intermediate space-side of the cylinder body shaft and preventing the cylinder body from being pulled out from external of the container body.

Preferably, the cylinder body shaft is tapered towards the external space.

Preferably, the cylinder body bulge is tapered towards the intermediate space.

According to the third aspect of the present invention, provided is a delaminatable container comprising an outer shell; an inner bag; and a cap to discharge contents stored in the inner bag, the inner bag shrinking as the contents decrease; wherein: an air inlet is formed on the outer shell and a filter is arranged to block the air inlet; and a combination of Gurley number of the filter, area of the filter, and discharge pressure of the cap is selected so that an amount of air leakage through the filter represented by the following equation would be 0.5 ml/sec to 2.4 ml/sec.

$$\text{amount of air leakage(ml/sec)} = 100 \text{ (ml)/Gurley number(sec)} \times \text{area of filter(m)/642 (mm}^2\text{)} \times \text{discharge pressure (kPa)/1.23 (kPa)}$$

According to the present invention, the contents-discharging characteristics and the recovery characteristics of the outer shell can be maintained even when a valve is not provided, since the filter having an amount of air leakage of 0.5 to 2.4 ml/sec is provided.

Here, Gurley number (sec) is an indicator which shows the easiness for the air to flow through, and is represented by the number of seconds necessary for a predetermined amount (100 ml in this case) of air to flow through a filter. The area of the filter refers to an area of the air inlet to which the filter is provided, and the discharging pressure is a pressure when the contents of the inner bag is discharged from the cap.

Hereinafter, various embodiments of the present invention will be described. The embodiments described hereinafter can be combined with each other.

Preferably, the Gurley number is 2.5 to 10 seconds.

Preferably, the filter is a hydrophobic filter which allows permeation of air and blocks water.

Preferably, the hydrophobic filter is a lamination of a hydrophobic microporous membrane and a nonwoven fabric.

Preferably, the hydrophobic filter is subjected to ultrasonic sealing in a direction where the outer shell is in contact with the nonwoven fabric.

BRIEF DESCRIPTION OF THE DRAWINGS

FIG. 2A, FIG. 2B, and FIG. 2C show the container body 3 of the delaminatable container 1 according to the first embodiment, where FIG. 2A shows a front view of the same, FIG. 2B shows a right-side view of the same, and FIG. 2C shows a plan view of the same.

FIG. 4A shows a condition before initial discharge, and FIG. 4B shows a condition after initial discharge.

FIG. 5A shows a condition before mounting the valve member, FIG. 5B shows a condition after mounting the valve member and before initial discharge, and FIG. 5C shows a condition after initial discharge.

FIG. 9A shows a front view of the same, FIG. 9B shows a right-side view of the same, and FIG. 9C shows a plan view of the same.

FIG. 10A shows a condition before mounting the valve member, FIG. 10B shows a condition after mounting the valve member and before initial discharge, and FIG. 10C shows a condition after initial discharge.

FIG. 11A is a front view of the delaminatable container 1 in a condition where the cap 23 and the valve member 4 are mounted onto the container body 3, and FIG. 11B is a front view showing only the container body 3.

FIG. 17A shows a condition in which the moving body 6 is in contact with the first stopper 5h to close the cavity 5g, and FIG. 17B shows a condition in which the moving body 6 is not in contact with the first stopper 5h, thereby allowing the intermediate space and the external space be connected.

FIG. 19A shows a front view of the cylinder body 5, FIG. 19B shows a bottom view of the cylinder body 5, FIG. 19C is a cross-sectional view showing the A-A section in FIG. 19B, FIG. 19D is a cross-sectional view showing the B-B section in FIG. 19C, FIG. 19E shows a cross-sectional view of the valve member 4, FIG. 19F shows a cross-sectional view of a condition in which the valve member 4 is mounted onto the outer shell 12, and FIG. 19G shows a cross-sectional view of a condition in which the moving body 6 is in contact with the first stopper 5h and closing the cavity 5g.

DETAILED DESCRIPTION

Figure 1A:
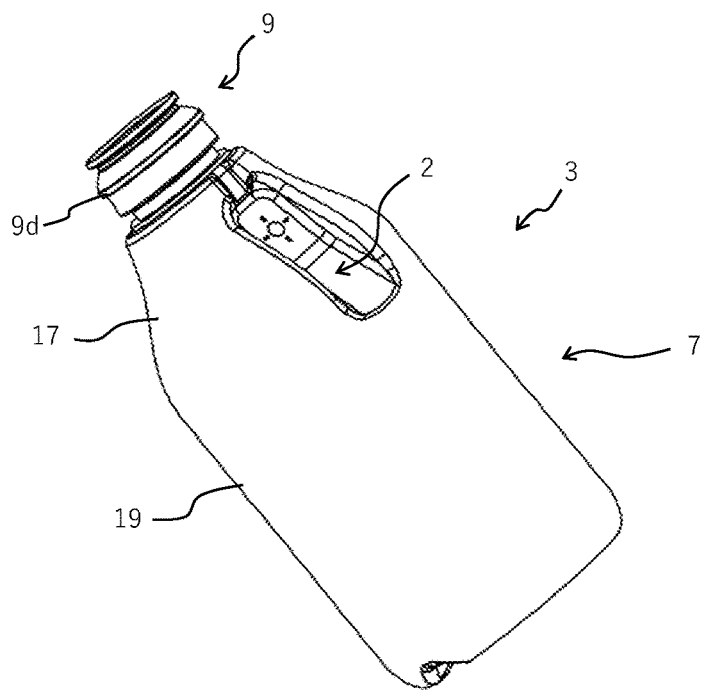
FIG. 1A is a perspective view of the container body 3 of the delaminatable container 1 according to the first embodiment of the first aspect of the present invention.

Various embodiments of the present invention will be described. For convenience of explanation, description will be given for the embodiments according to the first to the third aspects of the present invention, however, an embodiment including two or more of the characteristics of the first to the third aspects can be carried out. That is, the embodiments according to the first to the third aspects of the present invention can be combined with each other. In addition, among the different aspects, there may be a case where the same reference number is assigned to a different constituent.

First Embodiment According to the First Aspect of the Invention

The first embodiment according to the first aspect of the present invention will be described with reference to FIG. 1A to FIG. 7B. As shown in FIG. 1A to FIG. 4B, the delaminatable container 1 of the present embodiment comprises a container body 3 and a valve member 4. The container body 3 comprises a storage portion 7 to store the contents, and a mouth 9 having an opening to discharge the contents from the storage portion 7.

Figure 3:
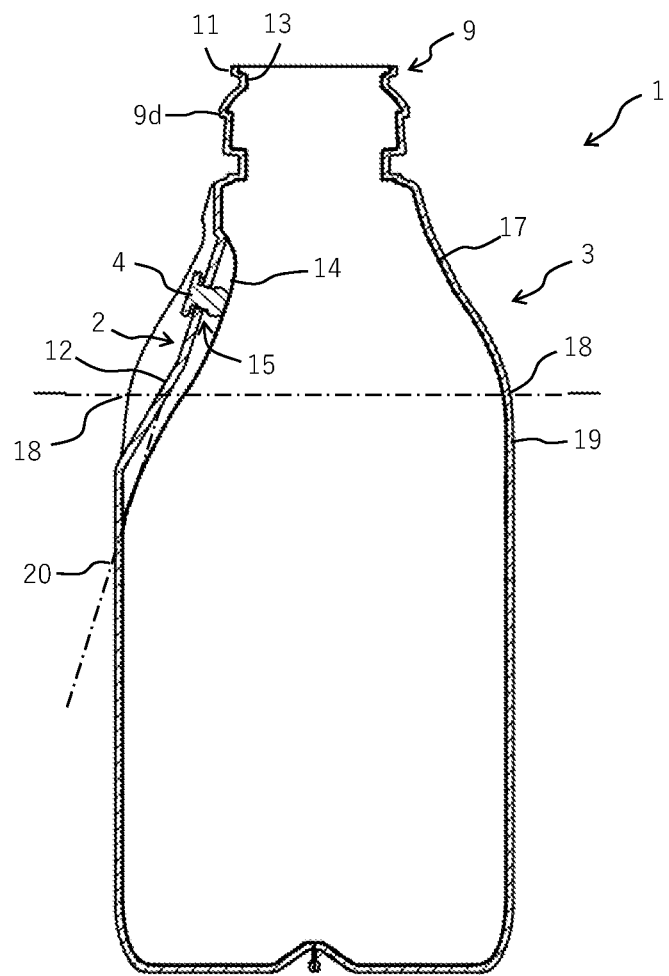
FIG. 3 is a cross-sectional view showing the A-A section in FIG. 2A, in a condition where the valve member 4 is mounted onto the container body 3 according to the first embodiment.
Figure 4A:
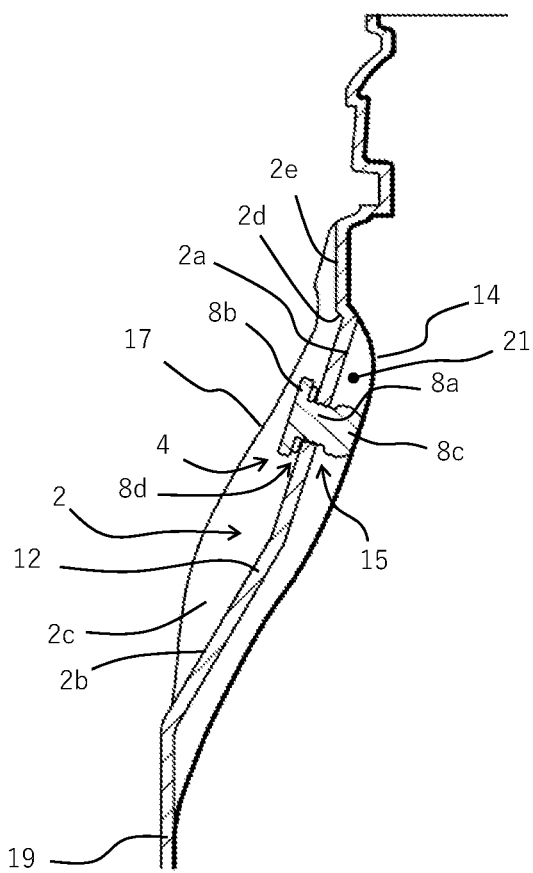
FIG. 4A and FIG. 4B are enlarged views of the vicinity of the valve housing recess 2 in FIG. 3, where
Figure 4B:
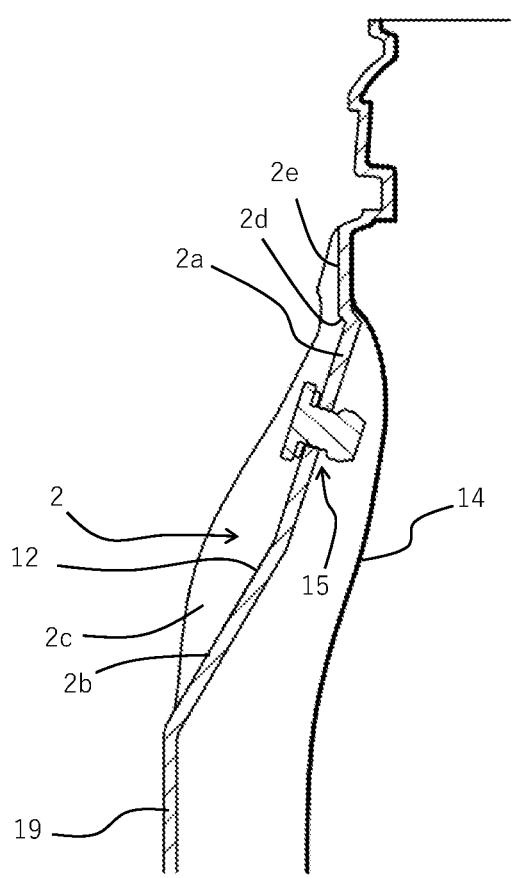
Figure 5A:
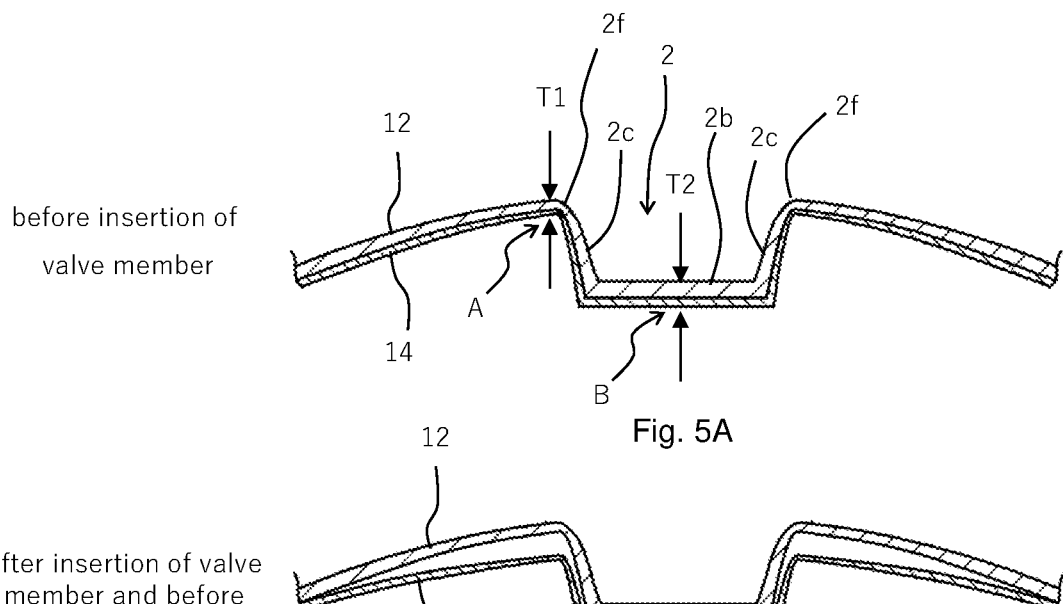
FIG. 5A, FIG. 5B, and FIG. 5C are cross-sectional views showing the B-B section in FIG. 2A, where
Figure 5B:
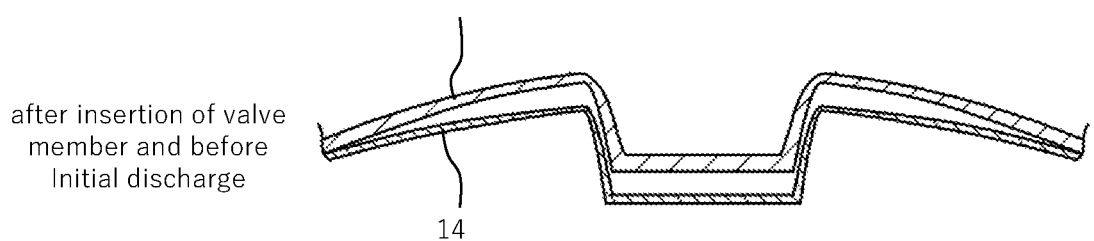
Figure 5C:
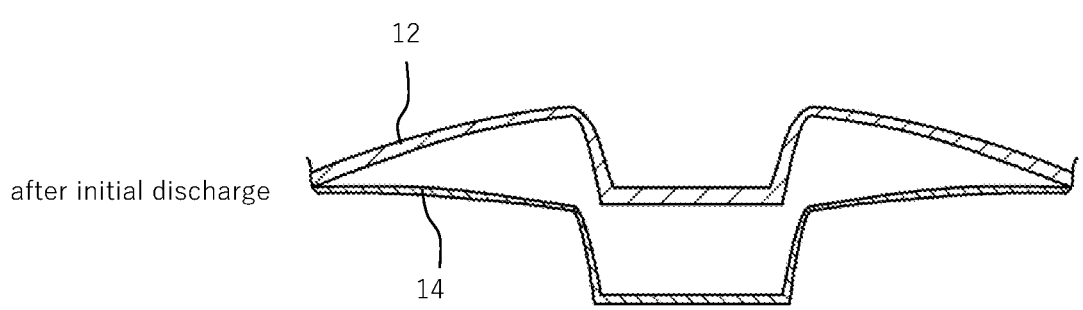

As shown in FIG. 3, the container body 3 comprises an outer layer 11 and an inner layer 13 within the storage portion 7 and the mouth 9. The outer shell 12 is structured by the outer layer 11, and the inner bag 14 is structured by the inner layer 13. When the contents decrease, the inner layer 13 separates from the outer layer 11, resulting in separation of the inner bag 14 from the outer shell 12 and shrinkage of the inner bag 14. Here, there is a case where a preliminary delamination is performed so that the inner layer 13 is delaminated from the outer layer 11, before storing the contents in the storage portion 7. In such case, the inner layer 13 is allowed to come in contact with the outer layer 11 by blowing air into the storage portion 7 or storing the contents in the storage portion 7, after the preliminary delamination. Then, the inner layer 13 separates from the outer layer 11 when the contents decrease. On the other hand, when the preliminary delamination is not performed, the inner layer 13 delaminates and separates from the outer layer 11 when the contents are discharged.

The outer layer 11 is, for example, formed with low density polyethylene, linear low density polyethylene, high density polyethylene, polypropylene, ethylene-propylene copolymer, and mixtures thereof. The outer layer 11 can have a multilayer structure. For example, the outer layer 11 can have a structure in which a repro layer is sandwiched with a virgin material. Here, the repro layer is a layer formed by recycling burrs generated when a container is molded. The outer layer 11 is formed with a larger thickness compared with the inner layer 13, so that the recovery characteristics would be high.

The inner layer 13 comprises an EVOH layer provided at the outer surface side of the container, an inner surface layer provided on the EVOH layer at the inner surface-side of the container, and an adhesive layer provided between the EVOH layer and the inner surface layer. By providing the EVOH layer, gas barrier property and the delaminating property from the 11 can be improved. The adhesive layer can be omitted.

The EVOH layer is a layer comprising ethylene-vinyl alcohol copolymer (EVOH) resin, and is obtained by hydrolysis of ethylene-vinyl acetate copolymer. The ethylene content of the EVOH resin is, for example, 25 to 50 mol %, and is preferably 32 mol % or lower in terms of oxygen barrier property. There is no particular definition regarding the lower limit of the ethylene content, however, 25 mol % or more is preferable since the flexibility of the EVOH layer degrades with less ethylene content.

The inner surface layer is a layer of the delaminatable container 1 which contacts with the contents, and comprises polyolefin such as low density polyethylene, linear low density polyethylene, high density polyethylene, polypropylene, ethylene-propylene copolymer, cyclo-olefin polymer and mixtures thereof. Preferably, the inner surface layer comprises low density polyethylene or linear low density polyethylene.

The adhesive layer is a layer which adheres the EVOH layer with the inner surface layer, and is the afore-mentioned polyolefin added with an acid-modified polyolefin (polyolefin having a carboxyl group introduced, such as maleic anhydride-modified polyethylene), or is an ethylene-vinyl acetate copolymer (EVA). An example of the adhesive layer is a mixture of low density polyethylene or linear low density polyethylene with acid-modified polyolefin.

The mouth 9 is provided with an engagement portion 9d which engages with a cap having a check valve. The cap can be mounted by press-fitting, or can be mounted with a screw.

As shown in FIG. 1 and FIG. 2, the storage portion 7 comprises a pillar (for example, a cylinder) body 19, and a shoulder 17 connecting the body 19 and the mouth 9. In the body 19, the cross-sectional area (or the diameter of the circumscribed circle) is substantially constant in the longitudinal direction of the storage portion. The shoulder has, for example, a truncated shape (for example, a truncated cone shape). In the shoulder 17, the cross-sectional area (or the diameter of the circumscribed circle) decreases gradually towards the mouth 9.

Figure 1B:
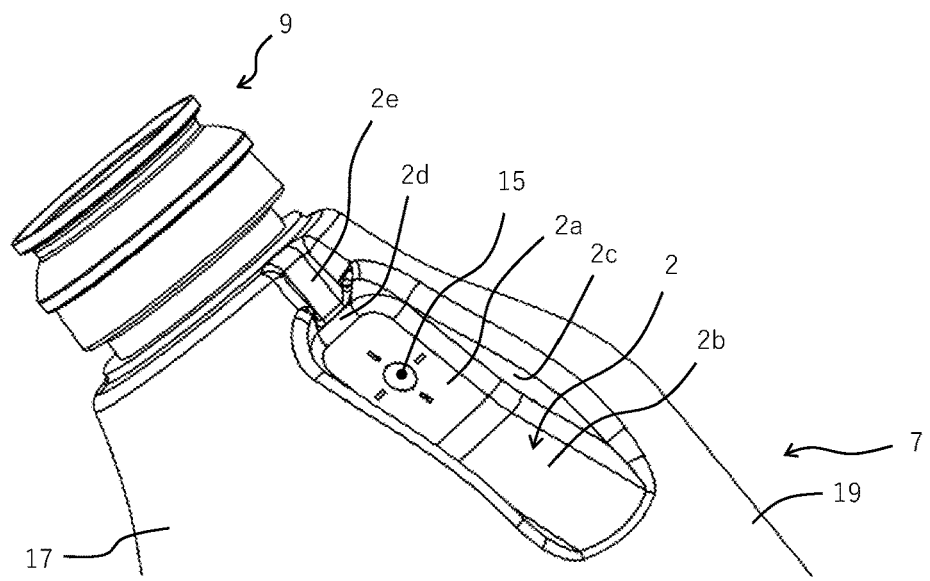
FIG. 1B is an enlarged view of the vicinity of the valve housing recess 2 in FIG. 1A.

As shown in FIG. 1B, the shoulder 17 is provided with a valve housing recess 2. The valve housing recess 2 reaches the boundary 18 of the shoulder 17 and the body 19, and further reaches the body 19. The recess 2 is provided with a substantially rectangular shape. An air inlet 15 is provided in the recess 2. The air inlet 15 is a through hole provided only in the outer shell 12, and connects the intermediate space 21 located between the outer shell 12 and the inner bag 14 with the external space S of the container body 3. Onto the air inlet 15, a valve member 4 is mounted to adjust charging/discharging of air between the intermediate space 21 and the external space S. The recess 2 is provided in order to avoid interference between the valve member 4 and a shrink film when the storage portion 7 is covered with the shrink film. In addition, an air circulation groove 2e which extends from the recess 2 towards the mouth 9 is provided so that the recess 2 is not sealed by the shrink film.

Figure 6:
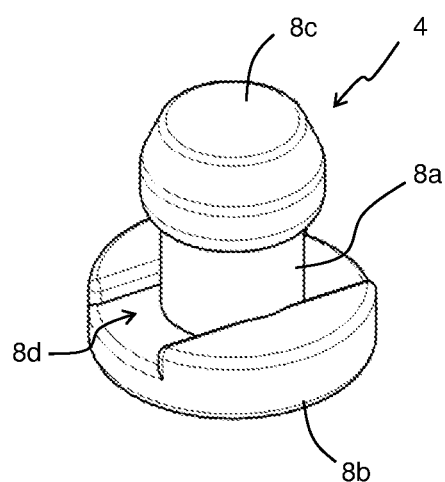
FIG. 6 is a perspective view of the valve member 4.

As shown in FIG. 6, the valve member 4 comprises a shaft 8a arranged in the air inlet 15, a lid 8c arranged at the intermediate space 21-side of the shaft 8a and having a larger cross-sectional area than the shaft 8a, and a locking portion 8b arranged at the external space S-side of the shaft 8a and preventing the valve member 4 from coming into the intermediate space 21. The valve member 4 can be mounted on the container body 3 by inserting the lid 8c into the intermediate space 21 while allowing the lid 8c to push and open the air inlet 15. Therefore, the tip of the lid 8c preferably has a tapered shape. Since such valve member 4 can be mounted by only pressing the lid 8c into the intermediate space 21 from the outside of the container body 3, productivity is high.

The lid 8c is structured so as to substantially close the air inlet 15 when the outer shell 12 is compressed, and the cross-sectional area decreases towards the shaft 8a. In addition, the locking portion 8b is structured so as to introduce air into the intermediate space 21 when the outer shell 12 is recovered after being compressed. When the outer shell 12 is compressed, the pressure in the intermediate space 21 becomes higher than the outer pressure, and thus the air in the intermediate space 21 leak out from the air inlet 15. With such difference in the pressure and the air flow, the lid 8c moves toward the air inlet 15 and closes the air inlet 15. Since the lid 18c has a shape in which the cross-sectional area decreases towards the shaft 8a, the lid 8c easily engages with the air inlet 15, thereby closing the air inlet 15.

When the outer shell 12 is further compressed in such condition, the pressure in the intermediate space 21 is increased, resulting in compression of the inner bag 14 and discharging of the contents in the inner bag 14. Further, when the compressing force applied to the outer shell 12 is released, the outer shell 12 recovers by its own elasticity. In such occasion, the lid 8c separates from the air inlet 15, allowing the closure of the air inlet 15 to be released, thereby introducing external air into the intermediate space 21. Further, a flow passage 8d is provided in the locking portion 8b so that the locking portion 8b would not close the air inlet 15. Accordingly, even when the locking portion 8b is in contact with the outer shell 12, the external air can be introduced into the intermediate space 21 via the flow passage 8d and the air inlet 15.

As shown in FIG. 1B, the recess 2 comprises the basal plane 2a having the air inlet 15, the body-side side surface 2b provided at the body 19-side of the basal plane 2a, the circumferential side surfaces 2c provided at both sides in the circumferential direction of the basal plane 2a, and the mouth-side side surface 2d provided at the mouth 9-side of the basal plane 2a. That is, the valve housing recess 2 is structured with the basal plane 2a being surrounded by side surfaces 2b, 2c, and 2d.

Figures 7A, 7B:
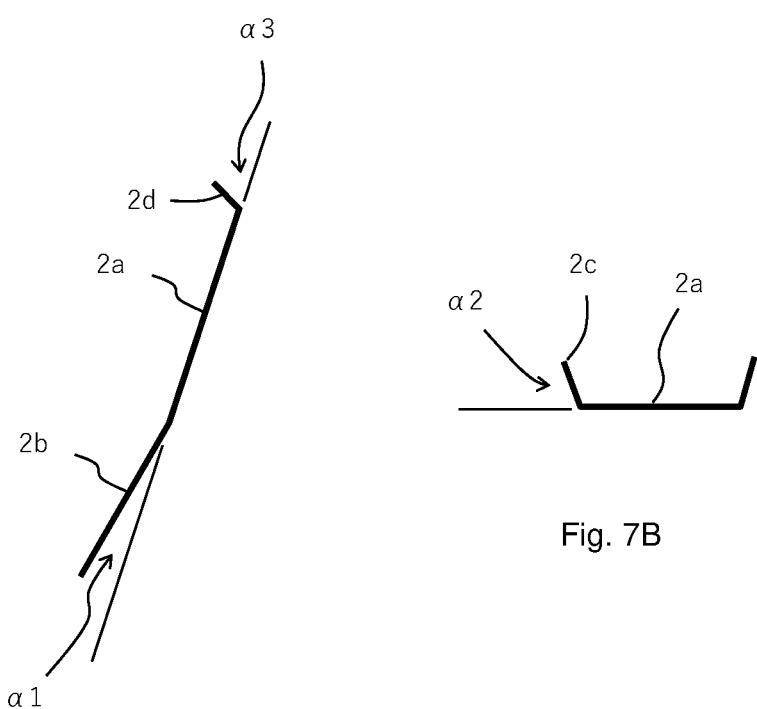
FIG. 7A a schematic diagram corresponding to A-A section in FIG. 2A, showing the tilt angles α1 and α3 of the body-side face 2b and the mouth-side face 2d with respect to the basal plane 2a of the valve housing recess 2, respectively.
FIG. 7B is a schematic diagram corresponding to C-C section in FIG. 2A, showing the tilt angle α2 of the circumferential side surface 2c with respect to the basal plane 2a of the valve housing recess 2, at a position where the air inlet 15 is mounted.

As shown in FIG. 7A, the side surface 2b has a tilt angle α1 which is an angle of the side surface 2b with respect to the basal plane 2a. The tilt angle α1 is 45 degrees or less, preferably 30 degrees or less, and more preferably 20 degrees or less, and further preferably 15 degrees or less. Since the tilt angle of the side surface 2b is small, the basal plane 2a of the recess 2 is smoothly connected with the outer periphery of the storage portion 7 at the body 19-side. With such constitution, the inner bag 14 would not be restricted by the outer shell 12 at the body 19-side (that is, there is no prop). Accordingly, the inner bag 14 can easily separate from the outer shell 12 at this portion, and the inner bag 14 is smoothly separated from the outer shell 12 from this portion as the starting point. There is no particular limitation regarding the lower limit of the tilt angle α1. When the tilt angle α1 is too small, the length of the recess 2 in the vertical direction would become too long. Therefore, the tilt angle α1 is preferably 5 degrees or larger. The tilt angle α1 is, particularly for example, 5, 10, 15, 20, 25, 30, 35, 40, or 45 degrees, and may be in the range between any of the two values exemplified herein.

Here, a side surface may not be provided at the body 19-side of the recess 2, and the basal plane 2a may directly connect with the outer periphery of the storage portion 7. Even in such case, in a similar manner as in the case where the tilt angle α1 is small, the basal plane 2a smoothly connects with the outer periphery of the storage portion 7. However, in a case where the basal plane 2a crosses with the body 19 by allowing the basal plane 2a to extend towards the body 19-side without providing the side surface 2b, the basal plane 2a and the body 19 would cross at position 20 in FIG. 3. This may not be preferable in some cases since the recess 2 would elongate to the position 20, making the length of the recess 2 in the vertical direction too long.

As shown in FIG. 7B, the tilt angle α2 which is an angle of the circumferential side surface 2c with respect to the basal plane 2a at a position where the air inlet 15 is provided is not particularly limited. The tilt angle α2 is preferably larger than the tilt angle α1, more preferably 50 degrees or larger, and further preferably 60 or larger, and even further preferably 70 degrees or larger. There is no particular limitation regarding the upper limit of the tilt angle α2, and is 85 degrees for example. The tilt angle α2 is, particularly for example, 50, 55, 60, 65, 70, 75, 80, or 85 degrees, and may be in the range between any of the two values exemplified herein.

As shown in FIG. 7A, the tilt angle α3 which is an angle of the mouth-side side surface 2d with respect to the basal plane 2a is not particularly limited. The tilt angle α3 is preferably larger than the tilt angle α1, more preferably 50 degrees or larger, and further preferably 60 or larger, and even further preferably 70 degrees or larger. There is no particular limitation regarding the upper limit of the tilt angle α3, and is 85 degrees for example. The tilt angle α3 is, particularly for example, 50, 55, 60, 65, 70, 75, 80, or 85 degrees, and may be in the range between any of the two values exemplified herein.

The side surface 2c rises gradually from the position where the air inlet 15 is provided towards the body 19-side. The height becomes highest at the vicinity of the boundary 18, and gradually descends towards the body 19. When the container body 3 is molded by blow molding, stretch of the parison would become large as the height of the side surface 2c rises, and the thickness of the container body would become thin.

When the thickness at position A adjacent to the recess 2 along the boundary 18 is taken as T1, and the thickness at position B at a central position in the direction along the boundary 18 within the recess 2 is taken as T2, thickness T2 is larger than thickness T1 since the blow rate at position A is larger than the blow rate at position B. The relation is preferably T2/T1≥1.2. The value of T2/T1 is, preferably 1.4 or larger, and more preferably 1.6 or larger. In such case, the thickness at position A becomes sufficiently thin, allowing the edge 2f of the recess 2 of the inner bag 14 to bend easily. Accordingly, the recess 2 would retain its shape as it is, and the inner bag 14 would shrink smoothly. There is no particular limitation regarding the upper limit of T2/T1, and is 3 for example. T2/T1 is, particularly for example, 1.2, 1.3, 1.4, 1.5, 1.6, 1.7, 1.8, 1.9, 2, 2.1, 2.2, 2.3, 2.4, 2.5, 2.6, 2.7, 2.8, 2.9, or 3, and may be in the range between any of the two values exemplified herein.

Second Embodiment According to the First Aspect of the Invention

The second embodiment according to the first aspect of the present invention will be described with reference to FIG. 8A to FIG. 10C. The present embodiment is similar to the first embodiment, and the differs mainly in the shape of the recess 2 at the vicinity of the boundary 18. Hereinafter, explanation will be given mainly for the difference.

Figure 8A:
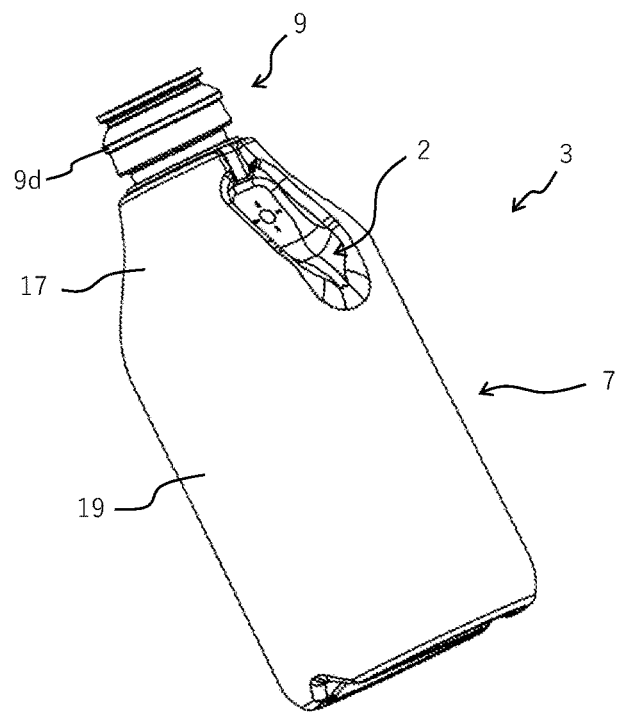
FIG. 8A is a perspective view of the container body 3 of the delaminatable container 1 according to the second embodiment of the first aspect of the present invention.
Figure 8B:
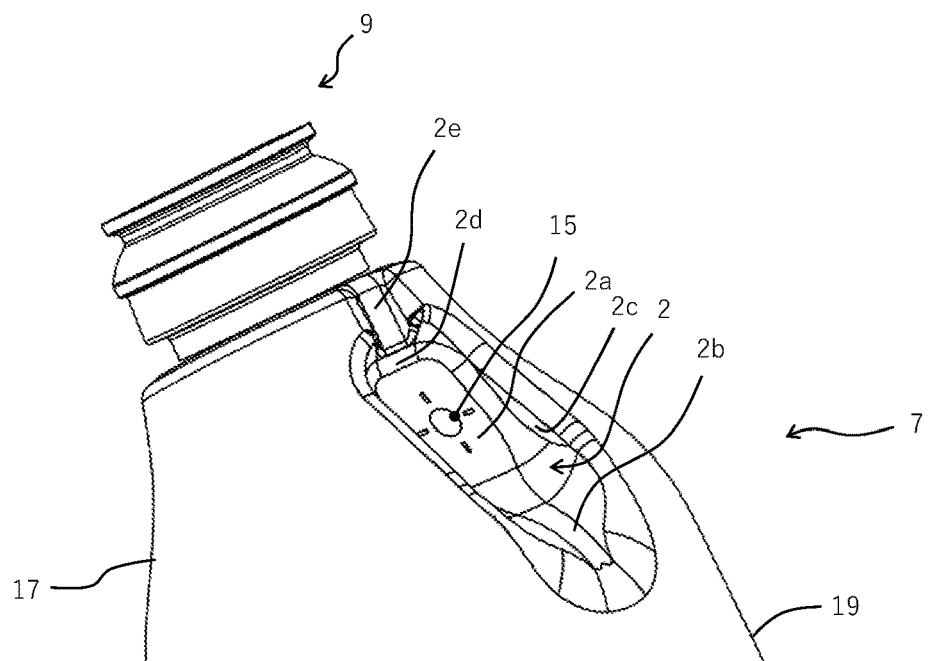
FIG. 8B is an enlarged view of the vicinity of the valve housing recess 2 in FIG. 8A.
Figure 9C:
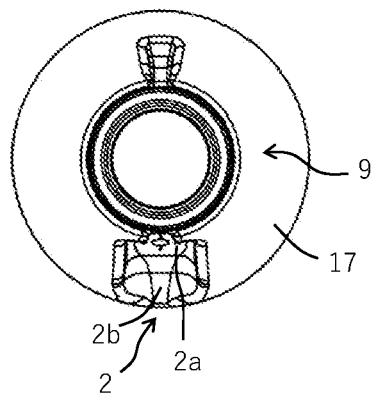
FIG. 9A, FIG. 9B, and FIG. 9C show the container body 3 of the delaminatable container 1 according to the second embodiment, where
Figure 9A:
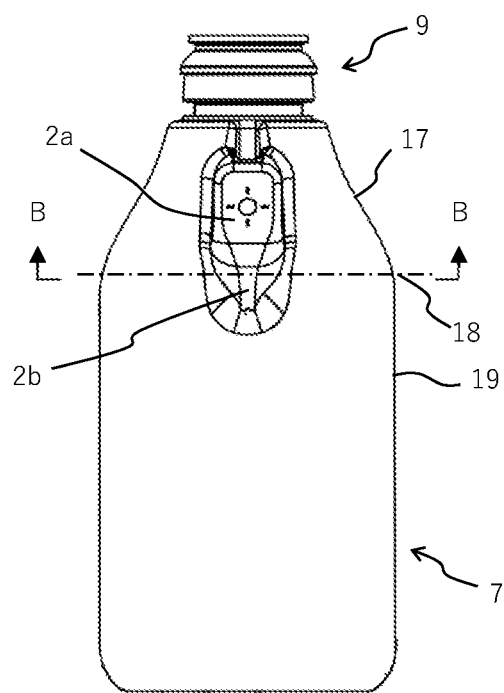
Figure 9B:
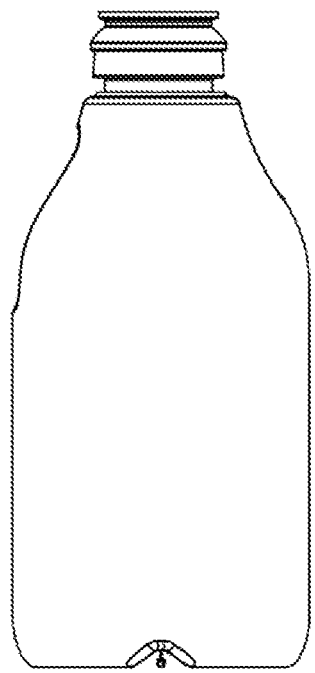
Figure 10A:
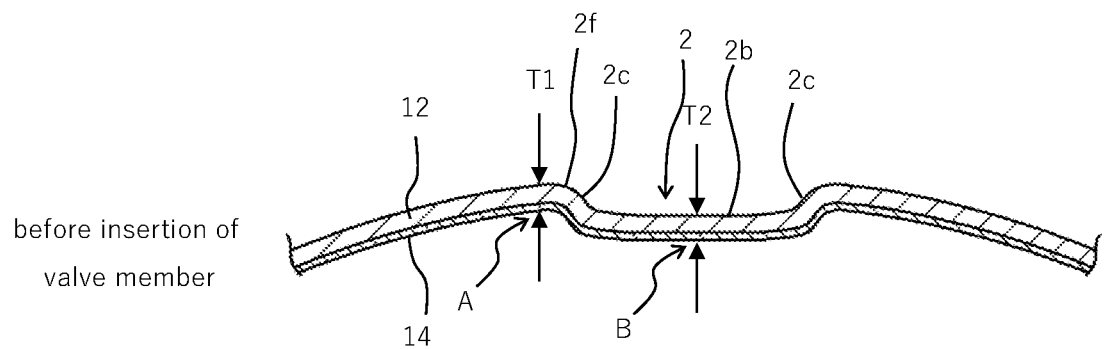
FIG. 10A, FIG. 10B, and FIG. 10C are cross-sectional views showing the B-B section in FIG. 9A, where
Figure 10B:
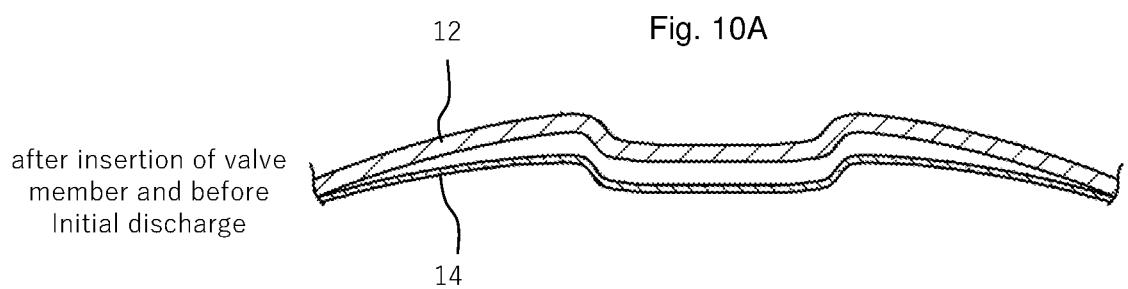
Figure 10C:
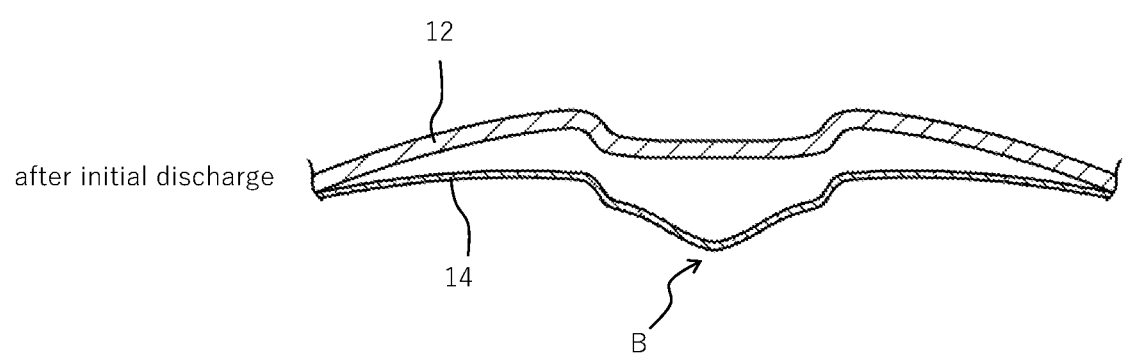

As shown in FIG. 8B, in the present embodiment, the vicinity of the side surface 2b has a more expanded shape compared with the first embodiment. As a result, as shown in FIG. 10A to FIG. 10C, the height of the side surface 2c at the boundary 18 is lower compared with that of the first embodiment, and the tilt angle is smaller than that the first embodiment. With such constitution of the present embodiment, the thickness T1 at position A adjacent to the recess 2 along the boundary 18 and the thickness T2 at position B at a central position in the direction along the boundary 18 within the recess 2 are nearly the same. That is, T2/T1 is nearly 1. Accordingly, thickness at position A becomes thicker than that of the first embodiment, and it becomes difficult for the edge 2f of the recess 2 of the inner bag 14 to bend. With such shape, position B is prone to being bent towards the inner side of the container when the inner bag 14 shrinks. When position B bends inwards, generation of pinholes at this position occur easily, and it becomes difficult for the inner bag 14 to separate from the outer shell 12. As discussed, the afore-mentioned problems may occur when T2/T1 is nearly 1. Therefore, as in the first embodiment, it is preferable that T2 and T1 satisfies the relation of T2/T1≥1.2.

First Embodiment According to the Second Aspect of the Invention

As shown in FIG. 11A to FIG. 12B, the delaminatable container 1 of the first embodiment according to the second aspect of the present invention comprises a container body 3, and a valve member 4. The container body 3 comprises a storage portion 7 to store the contents, and a mouth 9 having an opening 9g to discharge the contents from the storage portion 7. In the present embodiment, the constitution of the container body 3 is similar to that of each of the afore-mentioned embodiments of the first aspect. Accordingly, explanation will be given hereinafter mainly on the valve member 4 which differs from the each of the embodiments of the first aspect.

Figure 22:
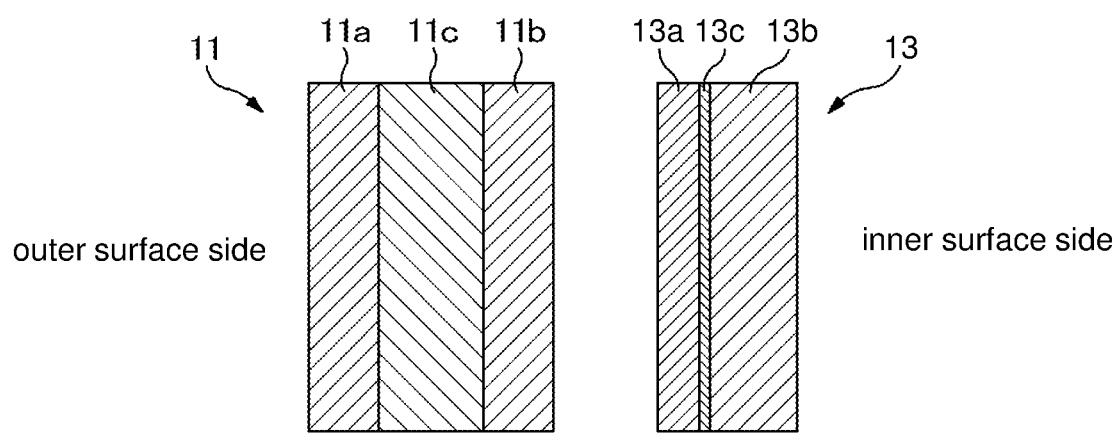
FIG. 22 is a cross-sectional view showing the laminated structure of the outer layer and the inner layer.

As shown in FIG. 22, in the present embodiment, the inner layer 13 comprises an EVOH layer 13a provided in the outer surface-side of the container, an inner surface layer 13b provided at the inner surface-side of the EVOH layer 13a, and an adhesive layer 13c provided between the EVOH layer 13a and the inner surface layer 13b. The EVOH layer 13a of the inner layer 13 of the container body 3 preferably contains an oxygen absorber. By allowing the oxygen absorber to be contained in the EVOH layer 13a, oxygen barrier property of the EVOH layer 13a can be further improved. In addition, tensile elasticity of the resin structuring the inner surface layer 13b is preferably 50 to 300 MPa, and more preferably 70 to 200 MPa. When the tensile elasticity is in such range, the inner surface layer 13b becomes particularly flexible. Tensile elasticity is, particularly for example, 50, 100, 150, 200, 250, or 300 Mpa, and may be in the range between any of the two values exemplified herein.

Figure 12A:
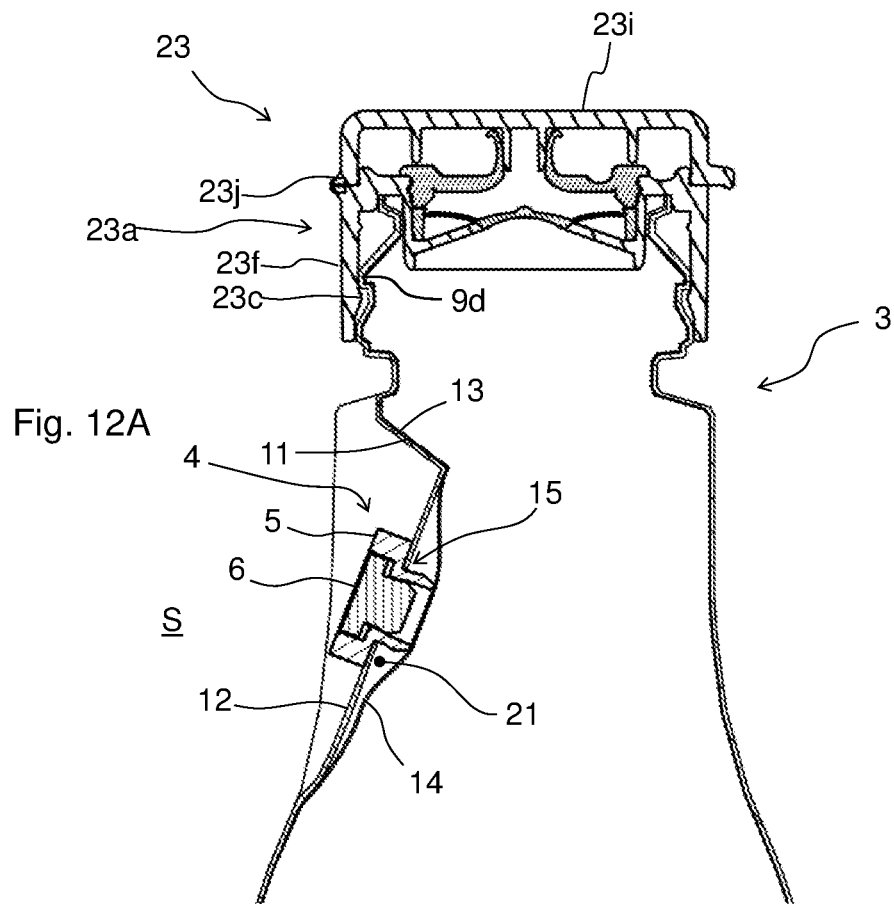
FIG. 12A is a cross-sectional view showing the A-A section in FIG. 11A.
Figure 12B:
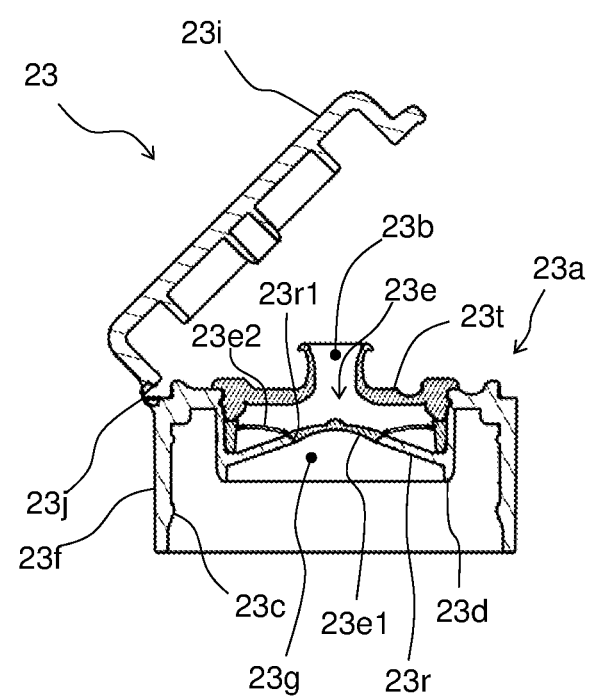
FIG. 12B is a cross-sectional view of the cap 23 in FIG. 12A in a condition where the cap cover 23i of the cap 23 is opened.

In the present embodiment, the cap 23 is mounted by press-fitting, and comprises a cap body 23a and a cap cover 23i, as shown in FIG. 12B. The cap body 23a and the cap cover 23i are connected by the connecting member 23j, thereby opening/closing the cap cover 23i. The cap body 23a comprises an upper portion 23t, a discharging outlet 23b provided in the upper portion 23t, a tubular portion 23f elongating like a cylinder from the outer circumference of the upper portion 23t, an engaging portion 23c provided along the inner circumference of the tubular portion 23f, an inner ring 23d elongating like a cylinder from the upper portion 23t within the tubular portion 23f, a flow passage 23g provided at the inner side of the inner ring 23d and being connected with the discharging outlet 23b, an annular valve seat 23r provided in the flow passage 23g and elongating inwards from the inner ring 23d, and a check valve 23e. The check valve 23e comprises a valve body 23e1 formed at the center of the annular valve seat 23r and closes the discharging pore 23r1, a plurality of elastic pieces 23e2 elongating from the inner ring 23d towards the center in a radial direction and supporting the valve body 23e1 with elastic force. Accordingly, when the valve body 23e1 is pressed upwards from the discharging pore 23r1 by the pressure increase in the storage portion 7, the check valve 23e is opened. The engaging portion 23c is a ring projection which engages with the engaging portion 9d of the mouth 9. In a condition where the cap 23 is mounted on the mouth 9, the contents in the storage portion 7 flows through the flow passage 23g and is discharged from the discharging outlet 23b. On the other hand, since the check valve 23e shuts out the incoming of the external air from the discharging outlet 23b, the external air would not enter the inner bag 14 of the container body 3, thereby preventing degradation of the contents. The constitution of the cap 23 mentioned here is merely an example, and a cap 23 having a check valve with another constitution can be adopted.

Figure 11A:
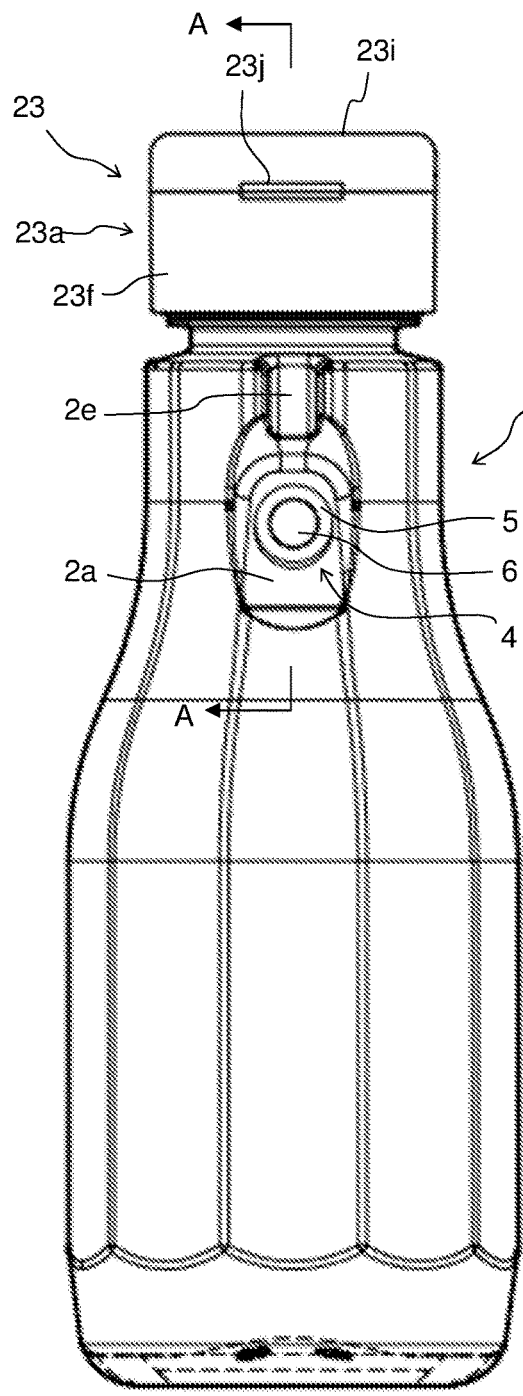
FIG. 11A and FIG. 11B show delaminatable container 1 according to the first embodiment of the second aspect of the present invention, where
Figure 11B:
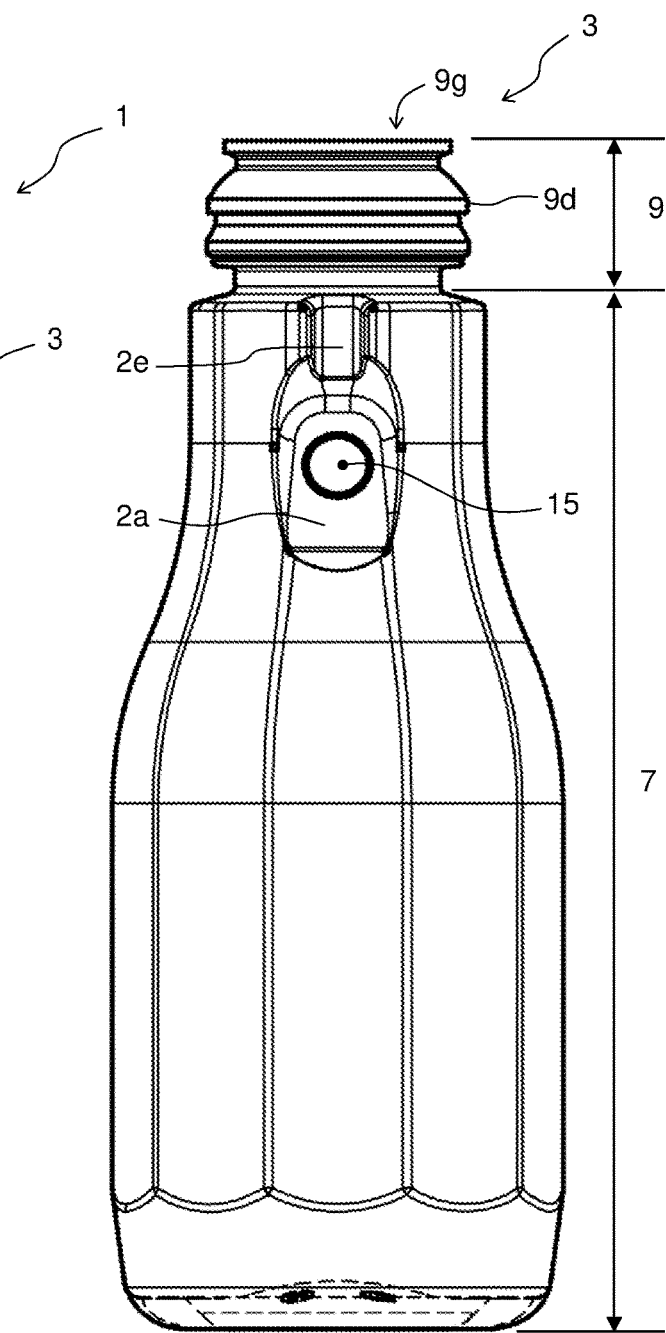

Further, in the present embodiment, as shown in FIG. 11A to FIG. 11B, the storage portion 7 is provided with a recess 2a to mount the valve member, the recess 2a being structured with an inclined plane surface. In the recess 2a, the air inlet 15 which is a through hole provided only to the outer shell 12 and connecting the intermediate space 21 and the external space S is provided. As shown in FIG. 11A to FIG. 13, the storage portion 7 is provided with the valve member 4 when the air inlet 15 is mounted. The valve member 4 adjusts charging/discharging of the air between the intermediate space 21 which is in between the outer shell 12 and the inner bag 14 and the external space S of the container body 3. Here, the recess 2a is provided to avoid interference of the valve member 4 and the shrink film, when the storage portion 7 is covered with the shrink film (refer to FIG. 12A for example). Further, in order to avoid the recess 2a from being sealed by the shrink film, an air circulation groove 2e elongating from the recess 2a towards the mouth 9 is provided (refer to FIG. 11A and FIG. 11B).

Figure 13:
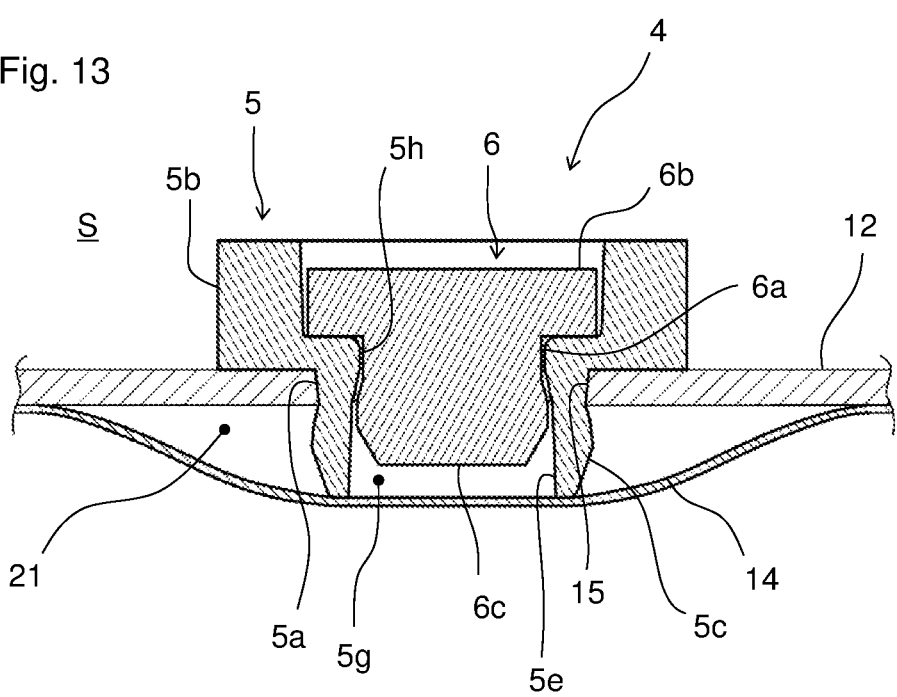
FIG. 13 is a cross-sectional view showing a condition where the valve member 4 is mounted onto the outer shell 12 in FIG. 11A.
Figure 14:
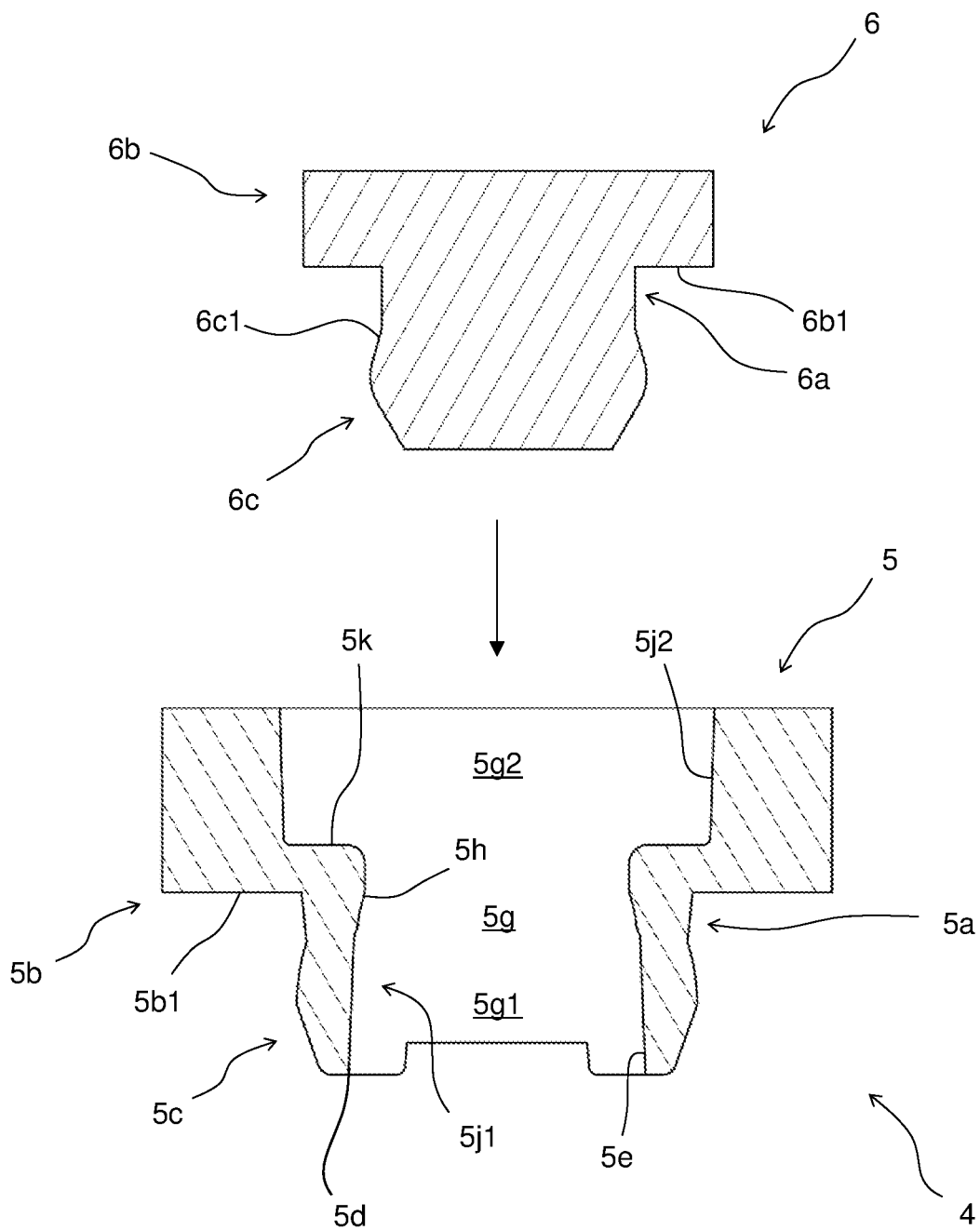
FIG. 14 is an exploded cross-sectional view of the cylinder body 5 and the moving body 6 of the valve member 4 of FIG. 11A.
Figure 15:
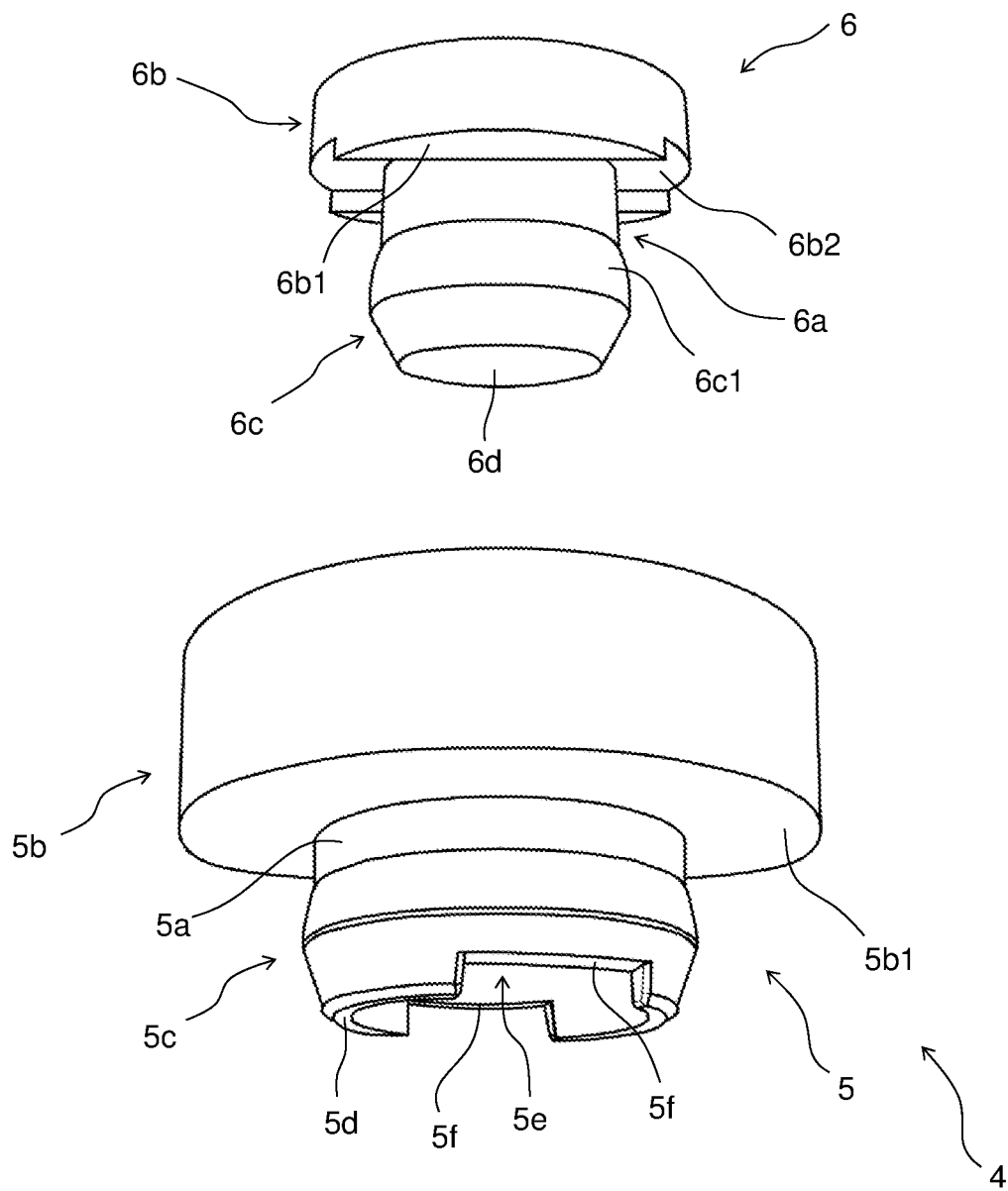
FIG. 15 is a perspective view of exploded valve member 4 of FIG. 14.
Figure 16:
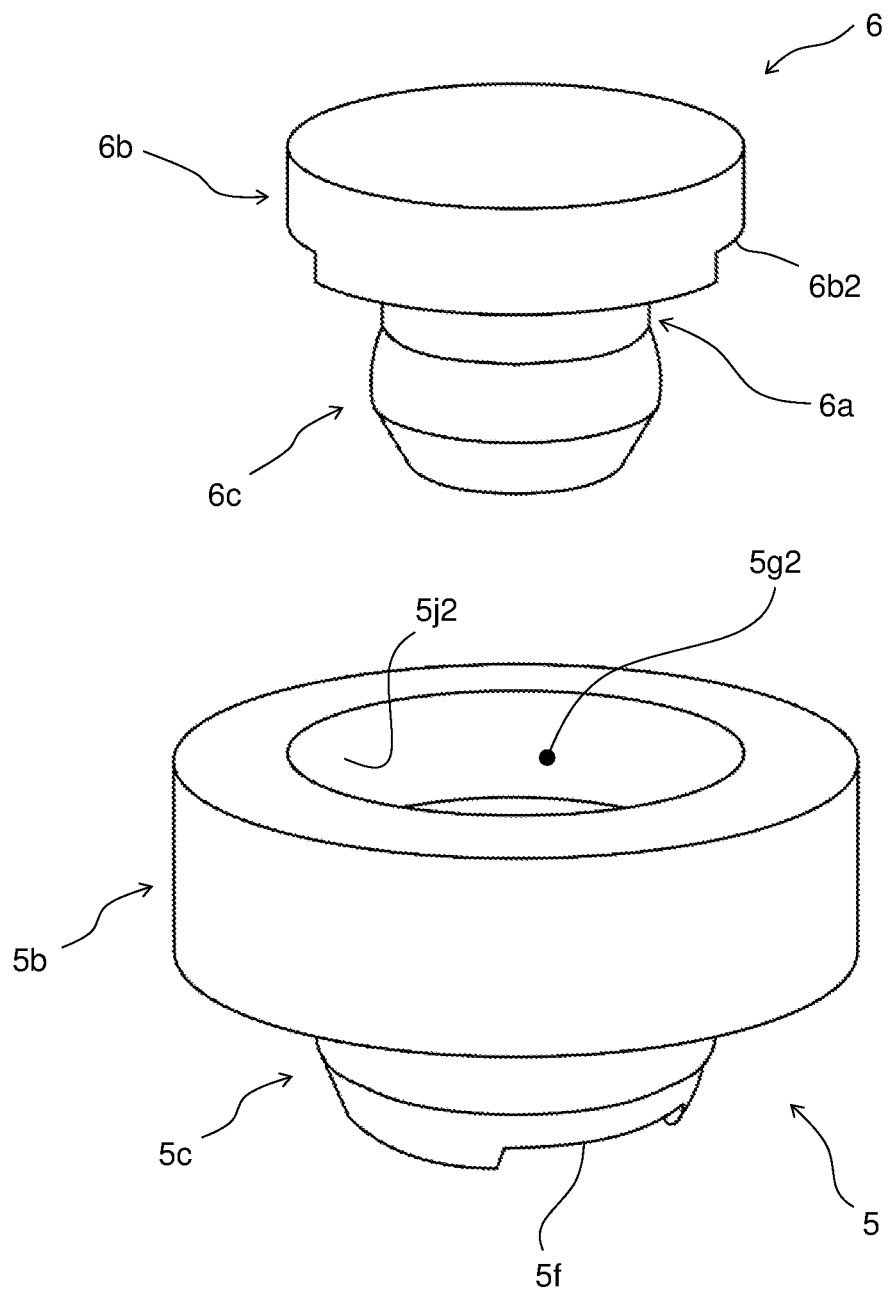
FIG. 16 is a perspective view of the same exploded valve member 4 observed from another angle.

As shown in FIG. 13 to FIG. 15, the valve member 4 comprises the cylinder body 5 having a cavity 5g connecting the external space S and the intermediate space 21, and the moving body 6 movably stored in the cavity 5g. The cylinder body 5 and the moving body 6 are molded by injection molding and the like. By pressing the moving body 6 into the cavity 5g so that the moving body 6 goes over the first stopper 5h described hereinafter, the moving body 6 can be installed in the cavity 5g.

As shown in FIG. 14, the cylinder body 5 comprises a cylinder body shaft 5a arranged in the air inlet 15, a cylinder body locking portion 5b arranged at the external space S-side of the cylinder body shaft 5a, and a cylinder body bulge 5c.

In the present embodiment, the cylinder body shaft 5a has a tapered shape towards the intermediate space 21. That is, the outer periphery of the cylinder body shaft 5a is a tapered surface. Further, by allowing the outer periphery of the cylinder body shaft 5a to adhere closely with the edge of the air inlet 15, the cylinder body 5 is mounted on the container body 3 (refer to FIG. 13). With such constitution, the gap between the edge of the air inlet 15 and the cylinder body 5 can be suppressed. Accordingly, leakage of the air in the intermediate space 21 from the gap between the edge of the air inlet 15 and the cylinder body 5 when the container body 3 is compressed can be suppressed. The cylinder body locking portion 5b has an outer diameter larger than the outer diameter of the cylinder body shaft 5a, and the intermediate space 21-side thereof serves as the locking surface 5b1 which contacts with the outer shell 12. When the cylinder body shaft 5a of the cylinder body 5 and the cylinder body bulge 5c are inserted into the air inlet 15, the cylinder body locking portion 5b prevents the cylinder body 5 from coming into the intermediate space 21. The cylinder body bulge 5c has an outer diameter in which the outer diameter at the central portion in the shaft direction is larger than the outer diameter of the cylinder body shaft 5a. Accordingly, by the cylinder body bulge 5c, the cylinder body 5 is prevented from being pulled out from the outside of the container body 3. Here, since the cylinder body 5 is mounted on the container body 3 by allowing the outer periphery of the cylinder body shaft 5a to adhere closely to the edge of the air inlet 15, the cylinder body bulge 5c is not necessarily essential.

Further, as shown in FIG. 15, the tip of the cylinder body 5 is a flat surface 5d, and the flat surface 5d is provided with the opening 5e which is connected to the cavity 5g. At two positions that face with each other in the circumferential direction, notches 5f are formed. With such constitution, the inner bag 14 is hardly damaged even when the tip of the cylinder body 5 contacts with the inner bag 14. Obstruction of the air flow can also be suppressed.

The cavity 5g of the cylinder body 5 comprises a narrowed portion 5g1 having a narrowed diameter formed by the cylinder body shaft 5a and the inner circumferential surface 5j1 of the cylinder body bulge 5c, and an expanded portion 5g2 having an expanded diameter formed by the inner circumferential surface 5j2 of the cylinder body locking portion 5b. As shown in FIG. 14, the cross-sectional shape of the cavity 5g has an approximately T-shape. At the boundary portion of the narrowed portion 5g1 and the expanded portion 5g2, the first stopper 5h which is a ring projection to reduce the diameter of the cavity 5g to have a smaller diameter than the narrowed portion 5g1, is provided. The first stopper 5h stops the moving body 6 when the moving body 6 moves from the intermediate space 21-side towards the external space S-side, thereby restricting the movement of the moving body 6 towards the external space S-side.

At a position in the external space S-side of the first stopper 5h, a second stopper 5k to restrict the movement of the moving body 6 towards the intermediate space 21-side is provided. The second stopper 5k is a ring plane surface formed at the external space S-side of the boundary portion of the narrowed portion 5g1 and the expanded portion 5g2. The second stopper 5k contacts with the locking portion 6b of the moving body 6 described later, thereby restricting the movement of the moving body 6 towards the intermediate space 21.

On the other hand, the moving body 6 is a pillar-shaped member having a substantially similar shape of the cavity 5g of the cylinder body 5. The moving body 6 comprises the shaft 6a, the locking portion 6b provided at the external space S-side of the shaft 6a, and the bulged portion 6c provided at the intermediate space 21-side of the shaft 6a. In the present embodiment, the moving body 6 has a size which allows the entirety of the moving body 6 be stored in the cavity 5g of the cylinder body 5.

The shaft 6a is designed to have an outer diameter a little smaller than the inner diameter of the first stopper 5h, and allows the moving body 6 to move in the shaft direction while being stored in the cavity 5g of the cylinder body 5. The locking portion 6b has an outer diameter larger than the outer diameter of the shaft 6a, and the outer surface of the moving body 6 at the intermediate space 21-side serves as the locking surface 6b1 which contacts with the second stopper 5k of the cylinder body 5 (refer to FIG. 15). The locking surface 6b1 prevents the moving body 6 from coming into the intermediate space 21 when the moving body 6 is stored in the cavity 5g of the cylinder body 5. As shown in FIG. 15, on the outer surface of the locking portion 6b located in the intermediate space 21-side, the flow passage 6b2 is provided. When the locking surface 6b1 of the locking portion 6b contacts with the second stopper 5k of the cylinder body, the external air can be introduced into the intermediate space 21 through the flow passage 6b2. In addition, the outer diameter of the bulged portion 6c at the central portion in the shaft direction is larger than the outer diameter of the shaft 6a. Accordingly, when the slope 6c1 at the external space S-side of the bulged portion 6c contacts with the first stopper 5h of the cylinder body 5, the flow of the air through the cavity 5g between the intermediate space 21 and the external spaceS is blocked, and the cavity 5g is closed. Here, in the present embodiment, flow of the air between the intermediate space and the external space can be completely blocked by achieving high dimensional accuracy of the first stopper 5h of the cylinder body 5 and the slope 6c1 at the external space S-side of the bulged portion 6c.

Figure 17A:
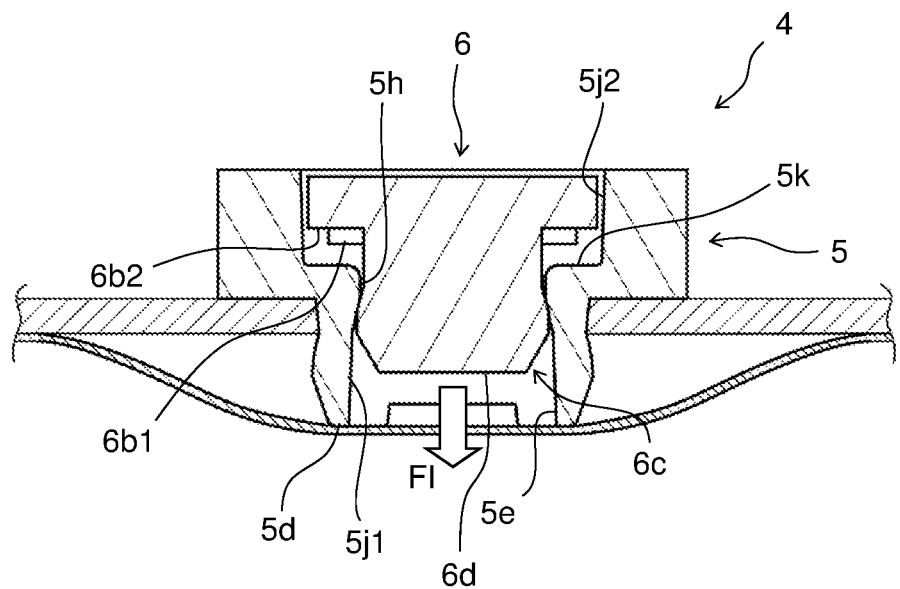
FIG. 17A and FIG. 17B are explanatory drawings of the conditions of the valve member 4 of FIG. 11A, where
Figure 17B:
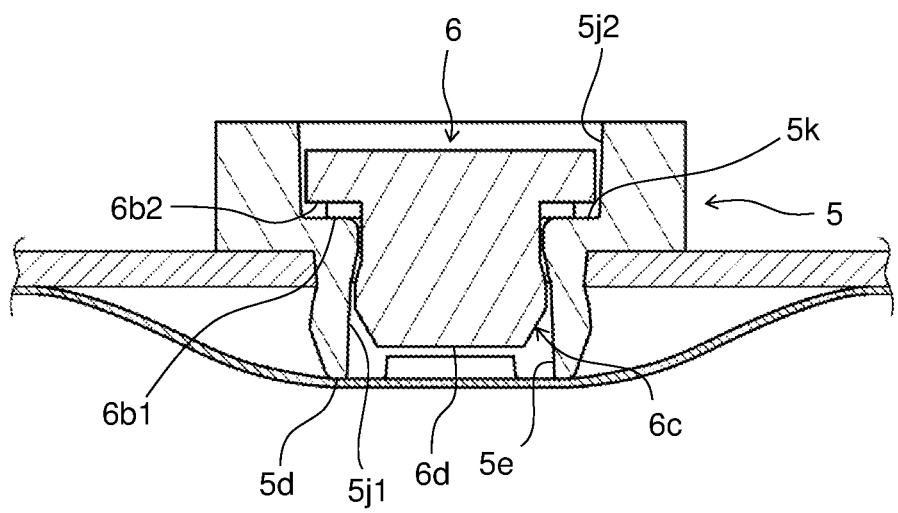

Here, the diameter of the cavity 5g at a cross section is slightly larger than the diameter of the moving body 6 at the corresponding cross section. As shown in FIG. 17A to 17B, the moving body 6 has a shape which allows the moving body 6 to freely move in the axial direction from a position where the bulged portion 6c contacts with the first stopper 5h (refer to FIG. 17A) to a position where the locking portion 6b contacts with the second stopper 5k (refer to FIG. 17B). The value of the ratio defined by (diameter of the cross section of the cavity 5g/diameter of the moving body 6 at the corresponding cross section) is preferably 1.01 to 1.2, and more preferably 1.05 to 1.15. When this value is too small, the smooth movement of the moving body 6 would be obstructed, and when this value is too large, the gap between the surface 5j which surrounds the cavity 5g and the moving body 6 would become too large, thereby resulting in a case where the force applied to the moving body 6 when the container body 3 is compressed would be insufficient.

The valve member 4 having such constitution can be mounted on the container body 3 by pressing and opening the air inlet 15 with the cylinder body bulge 5c of the cylinder body 5, thereby inserting the cylinder body bulge 5c into the intermediate space 21. Therefore, the tip of the cylinder body bulge 5c is preferably tapered. Such valve member 4 can be mounted by only pressing the cylinder body bulge 5c into the intermediate space 21 from the external side of the container body 3, and thus has superior productivity. Here, since the flat surface 5d is provided at the tip of the cylinder body 5, the inner bag 14 is hardly damaged even when the tip of the valve member 4 contacts with the inner bag 14 when the valve member 4 is being pressed into the intermediate space 21.

Next, the operation principle of the valve member when the delaminatable container according to the present embodiment is used will be explained.

As shown in FIG. 13, the valve member 4 is retained in the outer shell 12 in a condition where the outer periphery of the cylinder body shaft 5a is adhered closely with the edge of the air inlet 15, when the valve member 4 is inserted into the air inlet 15 from the cylinder body bulge 5c-side and further pressed to a position where the cylinder body locking portion 5b contacts with the outer surface of the outer shell 12. When the outer shell 12 is compressed in a condition where air is contained in the intermediate space 21, the air in the intermediate space 21 enters the cavity 5g via the opening 5e, and presses the moving body 6 upwards, thereby allowing the moving body 6 to contact with the first stopper 5h (refer to FIG. 17A). When the moving body 6 contacts with the first stopper 5h, the flow of the air via the cavity 5g is blocked.

When the outer shell 12 is further compressed in such condition, the pressure in the intermediate space 21 is increased. As a result, the inner bag 14 is compressed, and the contents in the inner bag 14 is discharged. When the compressing force applied to the outer shell 12 is released, the outer shell 12 recovers by its own elasticity. With the recovery of the outer shell 12, the pressure in the intermediate space 21 decreases, resulting in application of a force FI to the moving body 6 in the direction towards the intermediate space 21, as shown in FIG. 17A. Accordingly, as shown in FIG. 17B, the moving body 6 moves in a direction towards the intermediate space 21, and contacts with the second stopper 5k. As a result, the external air is introduced into the intermediate space 21 through the gap between the moving body 6 and the inner circumferential surfaces 5j1 and 5j2, the flow passage 6b2, and through the opening 5e, thereby recovering the outer shell 12.

Here, regarding the valve member 4 of the present embodiment, as shown in FIG. 17A to FIG. 17B, the end portion 6d of the moving body 6 at the intermediate space 21-side is maintained to be positioned at the external space S-side with respect to the flat surface 5d which is the tip of the cylinder body 5, in either conditions where the moving body 6 has moved towards the external space S-side to allow the bulged portion 6c to come in contact with the first stopper 5h, or where the moving body 6 has moved towards the intermediate space 21-side to allow the locking portion 6b to come in contact with the second stopper 5k. With such constitution, interference of the inner bag 14 with the moving body 6 to obstruct the movement of the moving body 6 is suppressed, thereby allowing swift and certain introduction of the external air into the intermediate space 21.

Here, the present invention can be carried out with the embodiments described hereinafter.

In the afore-mentioned embodiment, the cylinder body shaft 5a of the cylinder body 5 was tapered towards the intermediate space 21-side. However, as shown by the cylinder body 5 in FIG. 18, the cylinder body shaft 5a can be tapered towards the external space-side. Accordingly, once the cylinder body 5 is mounted on the outer shell 12 of the air inlet 15, the cylinder body 5 hardly comes out.

Figure 18:
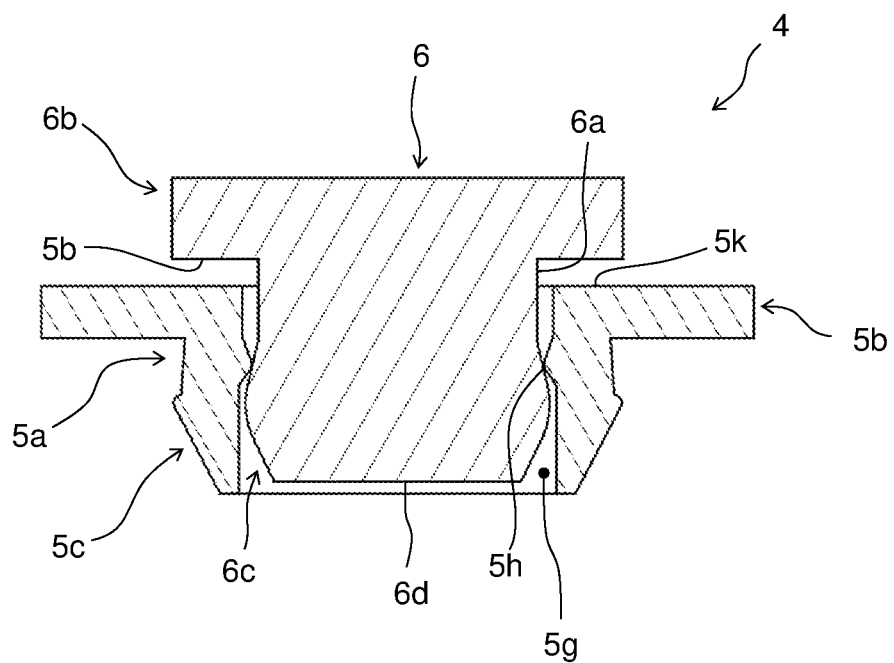
FIG. 18 is a cross-sectional view showing an alternative example of the valve member 4 of FIG. 11A.

In the afore-mentioned embodiment, the entirety of the moving body 6 was stored in the cylinder body 5, however, as shown in FIG. 18, the locking portion 6b of the moving body 6 can be positioned outside the cavity 5g. In such case, the second stopper 5k is structured by the end face of the cylinder body 5 at the external space S-side.

In the afore-mentioned embodiment, the moving body 6 was always located at the external space S-side with respect to the flat surface 5d of the cylinder body 5. The end portion 6d of the moving body 6 can be positioned at the intermediate space 21-side with respect to the flat surface 5d of the cylinder body 5 by a small distance, when the moving body 6 is moved towards the intermediate space 21 to allow the locking portion 6b to come in contact with the second stopper 5k. Even in such case, the force applied to the moving body 6 in the direction towards the external side of the container due to the recovering force of the inner bag 14 is suppressed when compared with the case where the cylinder body 5 is not provided. Accordingly, obstruction of the movement of the moving body 6 is suppressed.

In the afore-mentioned embodiment, the cavity 5g had a columnar shape resembling a shape structured by laminating columns having different diameters, and thus the moving body 6 had a shape substantially similar to a downsized cylinder body 5. However, the cavity 5g and the moving body 6 can have a different shape so long as they can realize the function of the present embodiment.

Second Embodiment According to the Second Aspect of the Invention

Figure 19:
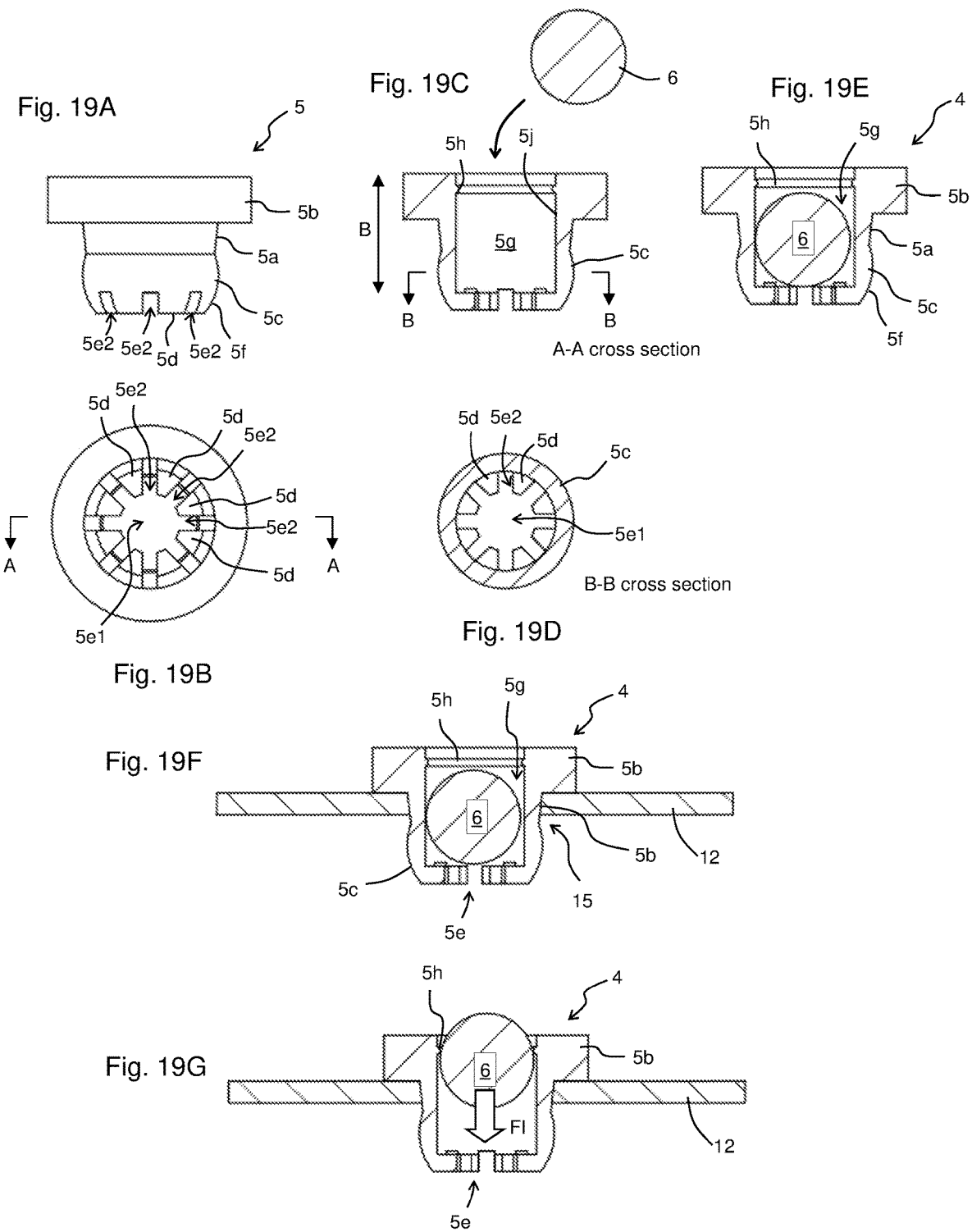
FIG. 19A to FIG. 19G show the valve member 4 of the delaminatable container 1 according to the second embodiment of the second aspect of the present invention.

Referring to FIG. 19, the delaminatable container of the second embodiment according to the second aspect of the present invention will be explained. In the second embodiment, only the constitution of the valve member 4 is different. Hereinafter, explanation will be given mainly on the difference.

The valve member 4 according to the present embodiment comprises the cylinder body 5 having the cavity 5g connecting the external space S and the intermediate space 21, and the moving body 6 movably stored in the cavity 5g. The cylinder body 5 and the moving body 6 are molded by injection molding and the like. By pressing the moving body 6 into the cavity 5g so that the moving body 6 goes over the first stopper 5h, the moving body 6 can be installed in the cavity 5g. In the present embodiment, the cavity 5g has a substantially columnar shape, and the moving body 6 has a substantially sphere shape. However, the cavity 5g and the moving body 6 can have a different shape so long as they can realize the function of the present embodiment. The diameter of the cavity 5g at a cross section (cross section shown in FIG. 19D) is slightly larger than the diameter of the moving body 6 at the corresponding cross section. Accordingly, the moving body 6 has a shape which allows the moving body 6 to freely move in the direction shown by arrow B in FIG. 19C. The value of the ratio defined by the diameter of the cross section of the cavity 5g/diameter of the moving body 6 at the corresponding cross section is preferably 1.01 to 1.2, and more preferably 1.05 to 1.15. When this value is too small, the smooth movement of the moving body 6 would be obstructed, and when this value is too large, the gap between the surface 5j which surrounds the cavity 5g and the moving body 6 would become too large, thereby resulting in a case where the force applied to the moving body 6 when the container body 3 is compressed would be insufficient.

The cylinder body 5 comprises the cylinder body shaft 5a arranged in the air inlet 15, the cylinder body locking portion 5b provided at the external space S-side of the cylinder body shaft 5a and preventing the cylinder body 5 from coming into the intermediate space 21, and the cylinder body bulge 5c provided at the intermediate space 21-side of the cylinder body shaft 5a and preventing the cylinder body 5 from being pulled out from the external of the container body 3. The cylinder body shaft 5a has a tapered shape towards the intermediate space 21. The cylinder body 5 is mounted on the container body 3 by allowing the outer periphery of the cylinder body shaft 5a to adhere closely with the edge of the air inlet 15. With such constitution, the gap between the edge of the air inlet 15 and the cylinder body 5 can be suppressed. Accordingly, leakage of the air in the intermediate space 21 from the gap between the edge of the air inlet 15 and the cylinder body 5 when the container body 3 is compressed can be suppressed. Here, since the cylinder body 5 is mounted on the container body 3 by allowing the outer periphery of the cylinder body shaft 5a to adhere closely with the edge of the air inlet 15, the cylinder body bulge 5c is not necessarily essential. In addition, the cylinder body shaft 5a can be tapered towards the outside of the container, or the shape of the circumference of the cylinder body shaft 5a can have a pillar shape which does not change in the axial direction.

At the surface 5j surrounding the cavity 5g, provided is a first stopper 5h which locks the moving body 6 when the moving body 6 moves towards the external space S-side from the intermediate space 21-side. The first stopper 5h is structured by a ring projection, and when the moving body 6 is in contact with the first stopper 5h, the flow of the air through the cavity 5g is blocked.

In addition, the tip of the cylinder body 5 is a flat surface 5d, and the flat surface 5d is provided with the opening 5e which is connected to the cavity 5g. The opening 5e has a central opening 5e1 provided at the center of the flat surface 5d and having a substantially circular shape, and a plurality of slits 5e2 which extend radially from the central opening 5e1. In the present embodiment, the slits 5e2 correpond to the second stopper in the Claims. With such constitution, the flow of the air would not be obstructed even when the moving body 6 is in contact with the bottom surface of the cavity 5g.

As shown in FIG. 14, the valve member 4 is retained in the outer shell 12 in a condition where the outer periphery of the cylinder body shaft 5a is adhered closely with the edge of the air inlet 15, when the valve member 4 is inserted into the air inlet 15 from the cylinder body bulge 5c-side and further pressed to a position where the cylinder body locking portion 5b contacts with the outer surface of the outer shell 12. When the outer shell 12 is compressed in a condition where air is contained in the intermediate space 21, the air in the intermediate space 21 enters the cavity 5g via the opening 5e, and presses the moving body 6 upwards, thereby allowing the moving body 6 to contact with the first stopper 5h. When the moving body 6 contacts with the first stopper 5h, the flow of the air via the cavity 5g is blocked.

When the outer shell 12 is further compressed in such condition, the pressure in the intermediate space 21 is increased. As a result, the inner bag 14 is compressed, and the contents in the inner bag 14 is discharged. When the compressing force applied to the outer shell 12 is released, the outer shell 12 recovers by its own elasticity. With the recovery of the outer shell 12, the pressure in the intermediate space 21 decreases, resulting in application of a force FI to the moving body 6 in the direction towards the inside of the container, as shown in FIG. 19G. Accordingly, as shown in FIG. 19F, the moving body 6 moves towards the bottom of the cavity 5g. As a result, the external air is introduced into the intermediate space 21 through the gap between the moving body 6 and the surface 5j, and through the opening 5e.

The valve member 4 can be mounted on the container body 3 by pressing and opening the air inlet 15 with the cylinder body bulge 5c, thereby inserting the cylinder body bulge 5c into the intermediate space 21. Therefore, the tip of the cylinder body bulge 5c is preferably tapered. Such valve member 4 can be mounted by only pressing the cylinder body bulge 5c into the intermediate space 21 from the external side of the container body 3, and thus has superior productivity. Here, since the flat surface 5d is provided at the tip of the cylinder body 5, the inner bag 14 is hardly damaged even when the tip of the valve member 4 contacts with the inner bag 14 when the valve member 4 is being pressed into the intermediate space 21.

Here, regarding the valve member 4 of the present embodiment having such structure, as shown in FIG. 19F and FIG. 19G, the end portion 6d of the moving body 6 at the intermediate space 21-side is maintained to be positioned at the external space S-side with respect to the flat surface 5d which is the tip of the cylinder body 5 (refer to FIG. 19A), in either conditions where the moving body 6 has moved towards the external space S-side to come in contact with the first stopper 5h, or where the moving body 6 has moved towards the intermediate space 21-side to come in contact with the slits 5e2 as the second stopper. With such constitution, interference of the inner bag 14 with the moving body 6 to obstruct the movement of the moving body 6 is prevented, thereby allowing swift and certain introduction of the external air into the intermediate space 21.

Embodiment According to the Third Aspect of the Invention

Figure 20:
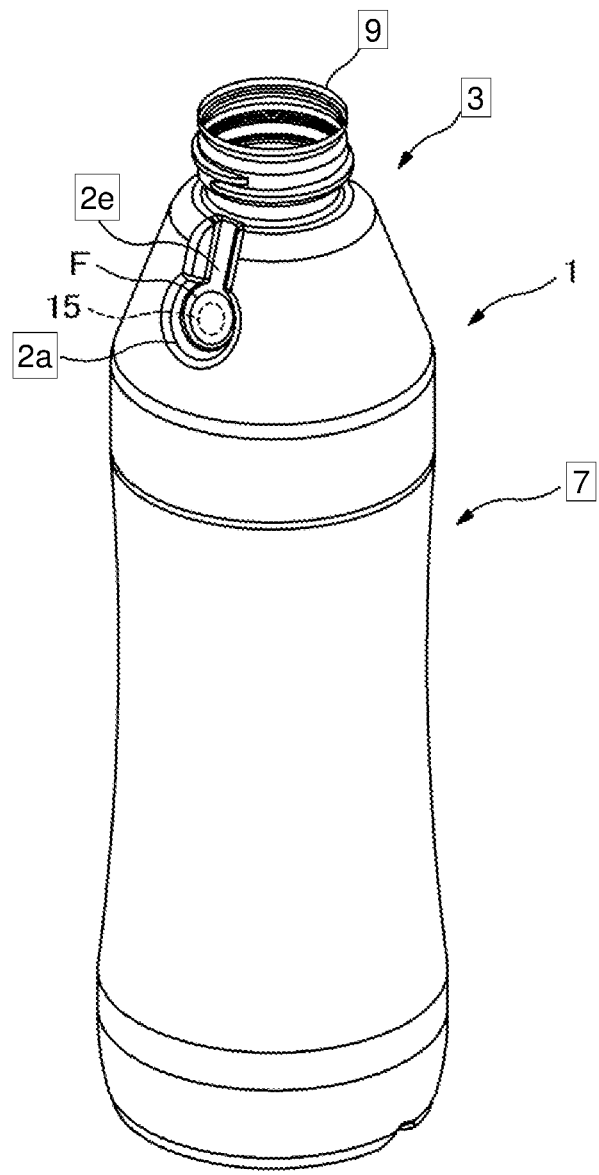
FIG. 20 is a perspective view showing the structure of the delaminatable container according to one embodiment of the third aspect of the present invention.
Figure 21:
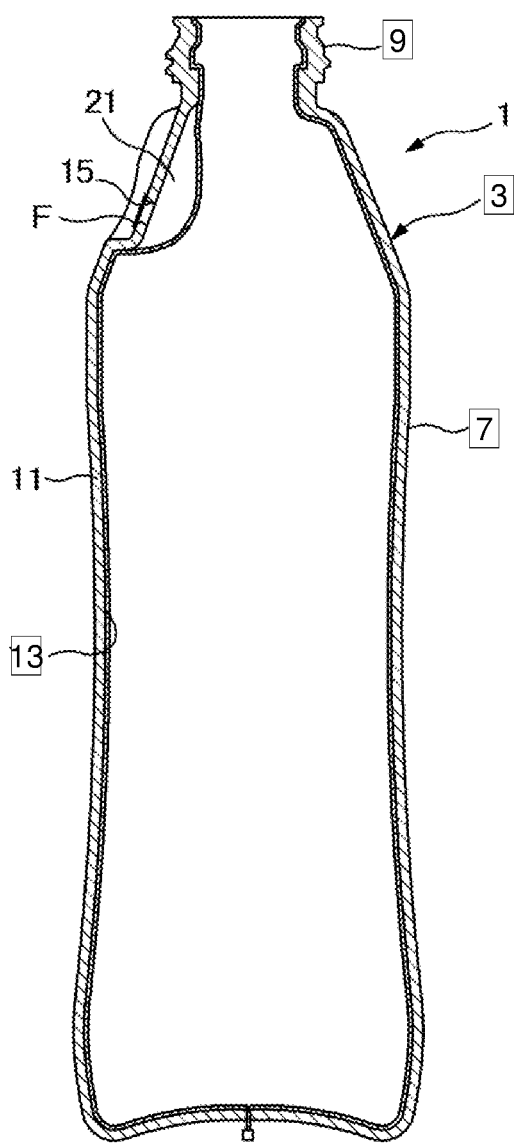
FIG. 21 is a schematic cross-sectional view of the delaminatable container shown in FIG. 20.

As shown in FIG. 20 and FIG. 21, the delaminatable container 1 of the embodiment according to the third aspect of the present invention has the container body 3 as the main body. The container body 3 comprises the storage portion 7 to store the contents and the mouth 9 to discharge the contents from the storage portion 7. Further as shown in FIG. 11A, the delaminatable container 1 comprises a cap 23 attached to the mouth 9, and when the delaminatable container 1 is under use, the contents are discharged from the discharging outlet 23b of the cap 23 (refer to FIG. 27A to FIG. 27F). Further as shown in FIG. 21, the container body 3 comprises the outer layer 11 as the outer shell and the inner layer 13 as the inner bag at the storage portion 7 and at the mouth 9. The inner layer 13 shrinks as the contents decreases.

The outer layer 11 and the inner layer 13 are subjected to blow molding as a multi-layered parison, and are integrally moled. The integrally molded body is used in the following manner for example. Before the integrally molded body is used, the inner layer 13 is separated from the outer layer 11, and then the contents are filled until the inner layer 13 is in contact with the outer layer 11. When the contents are squeezed out, the inner layer 13 skinks smoothly. In a different manner of usage, the inner layer 13 is kept laminated with the outer layer 11, and the inner layer 13 can separate from the outer layer 11 and shrink as the contents are discharged.

A further precise explanation will be given for the layer constitution of the container body 3. The container body 3 comprises, as afore-mentioned, the outer layer 11 and the inner layer 13. Here, the outer layer 11 is thicker than the inner layer 13 to achieve high recovery characteristics.

The outer layer 11 is, for example, formed with low density polyethylene, linear low density polyethylene, high density polyethylene, polypropylene, ethylene-propylene copolymer, and mixtures thereof. The outer layer 11 has a single-layer structure or a multilayer structure.

The outer layer 11 can be formed so as to contain a random copolymer of propylene and another monomer. Accordingly, the shape recovery characteristics, transparency, and heat resistance of the outer layer 11 as the outer shell can be improved.

The monomer content of the random copolymer regarding the monomer other than propylene is less than 50 mol %, and is preferably 5 to 35 mol %. The content is, particularly for example, 5, 10, 15, 20, 25, or 30 mol %, and may be in the range between any of the two values exemplified herein. As the monomer beng copolymerized with propylene, those which can improve the impact resistance of the random copolymer when compared with that of the propylene homopolymer can be used, and ethylene is especially preferable. When the random copolymer is a random copolymer of propylene and ethylene, ethylene content is preferably 5 to 30 mol %, and is particularly for example, 5, 10, 15, 20, 25, or 30 mol %, and may be in the range between any of the two values exemplified herein. The random copolymer preferably has a weight average molecular weight of $1\times10^5$ to $5\times10^5$, and more preferably $1\times10^5$ to $3\times10^5$. The weight average molecular weight is, particularly for example, $1\times10^5$, $1.5\times10^5$, $2\times10^5$, $2.5\times10^5$, $3\times10^5$, $3.5\times10^5$, $4\times10^5$, $4.5\times10^5$ or $5\times10^5$, and may be in the range between any of the two values exemplified herein.

Further, the random copolymer preferably has a tensile elasticity of 400 to 1600 MPa, and more preferably 1000 to 1600 MPa. When the tensile elasticity is in such range, the shape recovery characteristics is especially preferable. The tensile elasticity is, particularly for example, 400, 500, 600, 700, 800, 900, 1000, 1100, 1200, 1300, 1400, 1500 or 1600, and may be in the range between any of the two values exemplified herein.

Here, when the container is excessively hard, the feeling when the container is used would become inferior. Accordingly, a flexible material such as linear low-density polyethylene can be blended to the random copolymer when structuring the outer layer 11. However, the material being blended to the random copolymer is blended preferably by less than 50 weight % with respect to the entire mixture, so as not to largely deteriorate the efficient characteristics of the random copolymer. For example, the outer layer 11 can be structured with a material prepared by blending the random copolymer and the linear low-density polyethylene by a weight ratio of 85:15.

The inner layer 13 comprises an EVOH layer 13a provided in the outer surface-side of the container, an inner surface layer 13b provided at the inner surface-side of the EVOH layer 13a, and an adhesive layer 13c provided between the EVOH layer 13a and the inner surface layer 13b. By providing the EVOH layer 13a, gas barrier property and delaminating property from the outer layer 11 can be improved.

The EVOH layer 13a is a layer comprising ethylene-vinyl alcohol copolymer (EVOH) resin, and is obtained by hydrolysis of ethylene-vinyl acetate copolymer. The ethylene content of the EVOH resin is, for example, 25 to 50 mol %, and is preferably 32 mol % or lower in terms of oxygen barrier property. There is no particular limitation regarding the lower limit of the ethylene content, however, 25 mol % or more is preferable since the flexibility of the EVOH layer 13a degrades with less ethylene content. Here, it is preferably that the EVOH layer 13a contains an oxygen absorber. By allowing the oxygen absorber be contained in the EVOH layer 13a, oxygen barrier property of the EVOH layer 13a can be further improved.

The inner surface layer 13b is a layer which contacts with the contents of the delaminatable container 1, and comprises polyolefin such as low density polyethylene, linear low density polyethylene, high density polyethylene, polypropylene, ethylene-propylene copolymer and mixtures thereof. Preferably, the inner surface layer 13b comprises low density polyethylene or linear low density polyethylene. The tensile elasticity of the resin structuring the inner surface layer 13b is preferably 50 to 300 MPa, and more preferably 70 to 200 MPa. When the tensile elasticity is in such range, the inner surface layer 13b becomes particularly flexible. Tensile elasticity is, particularly for example, 50, 100, 150, 200, 250, or 300 Mpa, and may be in the range between any of the two values exemplified herein.

The adhesive layer 13c is a layer which adheres the EVOH layer 13a with the inner surface layer 13b, and is the afore-mentioned polyolefin added with an acid-modified polyolefin (polyolefin having a carboxyl group introduced, such as maleic anhydride-modified polyethylene), or is an ethylene-vinyl acetate copolymer (EVA). An example of the adhesive layer 13c is a mixture of low density polyethylene or linear low density polyethylene with acid-modified polyolefin.

The constitution of the layers of the container body 3 is as described above. In the container body 3, the mouth 9 is provided with a male screw portion, and the cap 23 (cover) having a female screw shown in FIG. 11A is fixed to the male screw portion. In the cap 23, a check valve not shown is built-in, and realizes a constitution which allows to discharge the contents in the inner layer 13 but does not allow the external air be introduced into the inner layer 13. When a cap having an inner ring is used, the outer surface of the inner ring would come into contact with the contacting surface of the mouth 9, thereby preventing leakage of the contents.

In addition, at the shoulder of the storage portion 7, the recess 2a is formed on the outer layer 11, and the air inlet 15 is bored at this position. The air inlet 15 is a through hole which is provided only with the outer layer 11, and does not reach the inner layer 13. When the air is introduced from the air inlet 15, the intermediate space 21 is formed between the outer layer 11 as the outer shell and the inner layer 13 as the inner bag. That is, the intermediate space 21 and the external space S are connected with each other by the air inlet 15.

Figure 23:
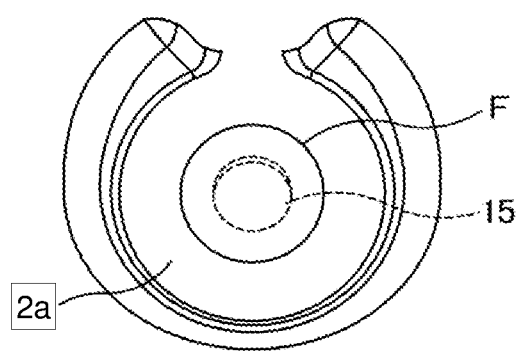
FIG. 23 is a schematic perspective view of the principal part of the enlarged vicinity of the air inlet.
Figure 24:
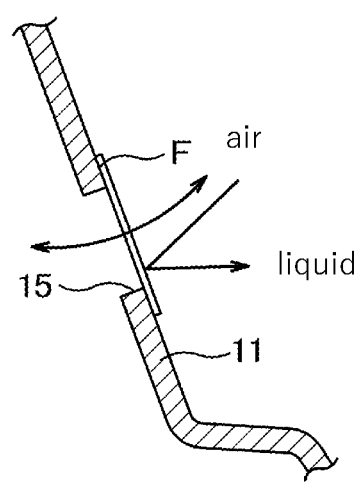
FIG. 24 is a schematic cross-sectional view of the principal part of the enlarged vicinity of the air inlet with enlargement.

In the delaminatable container of the present embodiment, a hydrophobic filter F is provided so as to block the air inlet 15, as shown in FIG. 23 and FIG. 24. Accordingly, introduction of water from the air inlet 15 can be prevented.

When the delaminatable container is used as a container of foods for example, the contents are filled at a high temperature (called hot pack), followed by shower cooling. Shower cooling is a process to cool the container by spraying the container with water from a shower. Here, when the shower cooling is performed after hot pack, the space between the outer layer 11 and the inner layer 13 would have a negative pressure, and water may be introduced from the air inlet 15.

The hydrophobic filter F has a water repelling property, and thus when such filter is adhered, introduction of water from the air inlet 15 can be prevented. As the hydrophobic filter F, it is necessary to use a filter which can allow introduction of air, since the air need be introduced between the outer layer 11 and the inner layer 13 from the air inlet 15, thereby recovering the outer layer after discharging by squeezing.

Accordingly, in the present invention, amount of air leakage via the filter F in a condition where the hydrophobic filter F is attached to the air inlet 15 need be considered to choose a suitable hydrophobic filter F. The amount of air leakage can be assumed to be proportional to the area of the hydrophobic filter F and to the discharge pressure, and is an amount calculated with the following equation.

$$\text{amount of air leakage(ml/sec)}=100 \text{ (ml)/Gurley number(sec)} \times \text{area of filter(m)}/642 \text{ (mm}^2) \times \text{discharge pressure (kPa)}/1.23 \text{ (kPa)}$$

Here, the Gurley number (sec) is based on the "Gurley air permeance" in accordance with the JIS-L1096, and is represented by the number of seconds necessary for a fixed volume (in this case, 100 ml) of air to pass through the filter. The Gurley air permeance is represented by the number of seconds required for the fixed volume of air to pass through a filter having a fixed area under fixed pressure. The smaller the value is, the easier the air permeates. Here, the area of the filter means the area of the air inlet to which the filter is provided (effective area), and the discharge pressure is the pressure when the contents in the inner bag are discharged from the cap.

In the present invention, combination of (A) Gurley number of the filter, (B) area of the filter, and (C) discharge pressure of the cap is selected so that the amount of air leakage would be 0.5 ml/sec to 2.4 ml/sec. When the value of the amount of air leakage is within such range, both of the superior capability to discharge only a small amount of the contents by one squeeze of the delaminatable container 1 (hereinafter referred to as discharge characteristics) and the superior capability of recovering the outer layer 11 after the squeeze (recovery characteristics) can be achievied.

As a particular combination of the afore-mentioned (A) to (C), for example, a delaminatable container 1 having a filter area of approximately 28 mm$^2$ (diameter of the air inlet 15 being 6 mm), a discharge pressure of 1.5 to 2.5 kPa is used, and a hydrophobic filter F having a Gurley number of approximately 4 seconds are used to adjust the value of the amount of air leakage in the afore-mentioned range. Further, when a hydrophobic filter F is used with the delaminatable container 1 having a filter area of approximately 28 mm$^2$ and a discharge pressure of 1.5 to 2.5 kPa, the Gurley number of the hydrophobic filter F is preferably 2.5 to 10 seconds, more preferably 3 to 7 seconds, and further more preferably 3.5 to 4.5 seconds. Gurley number is, particularly for example, 2.5, 3, 3.5, 4, 4.5, 5, 5.5, 6, 6.5, 7, 7.5, 8, 8.5, 9, 9.5, or 10 seconds, and may be in the range between any of the two values exemplified herein.

Further, when a cap having a check valve which adjusts the discharge pressure to be lower than 1.5 kPa is used, a hydrophobic filter F having a Gurley number smaller than the value mentioned above can be used. For example, the Gurley number can be in the range of 1.0 to 2.5 seconds.

Figure 25:
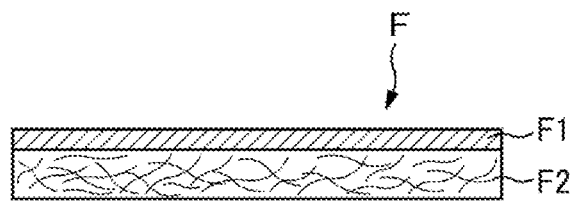
FIG. 25 is a schematic cross-sectional view showing an example of a hydrophobic filter.

As such hydrophobic filter F, a ventilating membrane having a double layer structure comprising a hydrophobic fluororesin microporous membrane (PTFE; polytetrafluoroethylene) F1 and a PET nonwoven fabric F2 can be used as shown in FIG. 25. The thickness of the hydrophobic filter F having such double layer structure is approximately 2 mm.

The nonwoven fabric F2 of the hydrophobic filter F shown in FIG. 25 serves as a lining of the microporous membrane F1, and reinforces the microporous membrane F1.

The hydrophobic filter F can be fixed onto the portion where the air inlet 15 of the delaminatable container is formed, by means of adhering or heat sealing. For example, in the case of heat sealing, the outer layer 11 which structures the delaminatable container may melt, and thus such means is difficult to apply. In addition, in the case of high frequency sealing, a metal film which serves as the heat source is necessary, and thus it is difficult to apply such means in fixing the hydrophobic filter F.

From such viewpoints, it is preferable that the hydrophobic filter F is fixed onto the delaminatable container by ultrasonic sealing. In the ultrasonic sealing, a horn is made to come in contact with the back surface of the hydrophobic filter F, followed by application of ultrasonic vibration and pressure, thereby completing the sealing instantly.

Here, it is preferable that the hydrophobic filter F is adhered using the nonwoven fabric F2-side as the adhering surface, so that the outer layer 11 and the nonwoven fabric F2 would come in contact with each other. This is since the resin melt by the ultrasonic wave would permeate into the nonwoven fabric F2, resulting in improvement in sealing strength.

Here, when performing the ultrasonic sealing, the sealing portion of the delaminatable container is easily depressed due to softness of the sealing portion. Accordingly, there is a case where it is difficult to allow the horn to uniformly contact with the back surface of the hydrophobic filter F. In such case, air can be blown into the delaminatable container to apply internal pressure. This allows to maintain the shape of the delaminatable container, and facilitates the procedures of contacting the horn with the back surface of the hydrophobic filter F, and ultrasonic sealing.

Figure 26A:
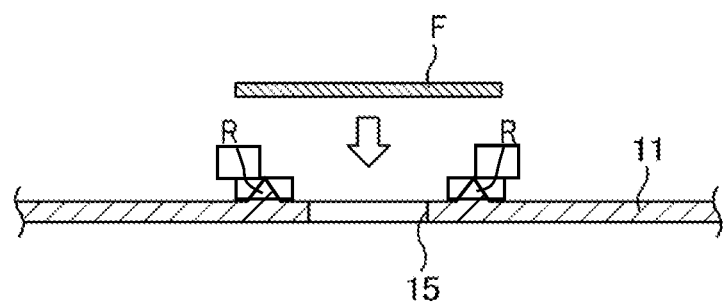
FIG. 26A and FIG. 26B are schematic cross-sectional views of the principal part of an example of a lib formed at the mounting portion of the hydrophobic filter.
Figure 26B:
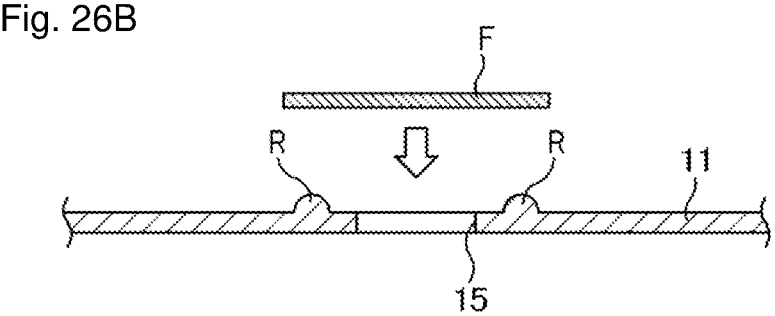

When ultrasonic sealing is performed, it is preferable that a rib is formed at the fixing portion of the delaminatable container (outer layer 11). FIG. 26A and FIG. 26B show how the rib R is formed on the outer layer 11 and how the hydrophobic filter F is subjected to ultrasonic sealing. In a case where a circular hydrophobic filter F is being fixed, the rib R can be formed around the air inlet 15 to have a circular shape with a diameter somewhat smaller than the diameter of the hydrophobic filter F. As the height of the rib R, 0.15 mm or higher is preferable, approximately 0.25 mm for example. The rib R functions as the energy director, and allows stable ultrasonic sealing. Here, the cross-section of the rib preferably has a triangular shape as shown in FIG. 26A, or can have a semicircular shape as shown in FIG. 26B. These shapes have a cross-sectional area which gradually increases towards the root of the rib.

If the inner layer 13 is in contact with the outer layer 11 when the ultrasonic sealing is performed, a hole may be formed in the inner layer 13 by the ultrasonic vibration. Accordingly, when ultrasonic sealing is performed, it is preferable that the inner layer 13 is kept away from the outer layer 11 at the vicinity of the fixing portion of the hydrophobic filter F.

Next, the operation principle when the delaminatable container 1 is used will be explained.

Figure 27B:
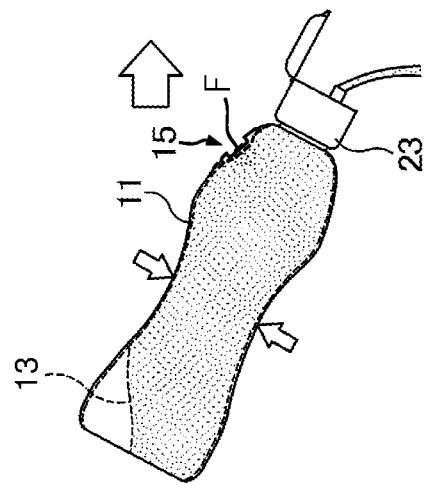
FIG. 27 to FIG. 27F show how the delaminatable container is used.
Figure 27C:
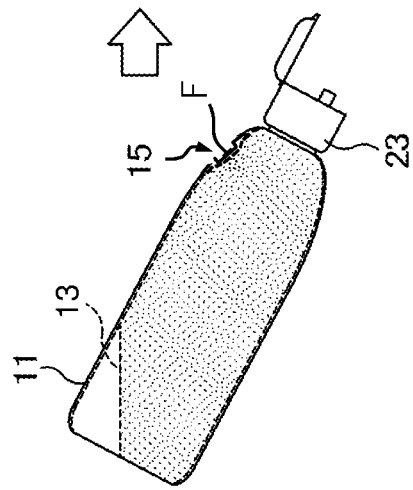
Figure 27A:
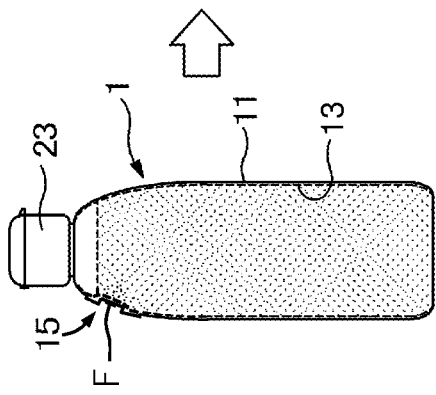

As shown in FIG. 27A to FIG. 27C, the side surface of the outer layer 11 is squeezed in a condition where the contents-filled product is tilted, thereby compressing the outer layer 11 to discharge the contents. At the initial usage, there is substantially no gap between the inner layer 13 and the outer layer 11. Accordingly, the compressig force applied to the outer layer 11 is directly applied to the inner layer 13 as the compressig force, thereby compressing the inner layer 13 to discharge the contents.

Figure 27F:
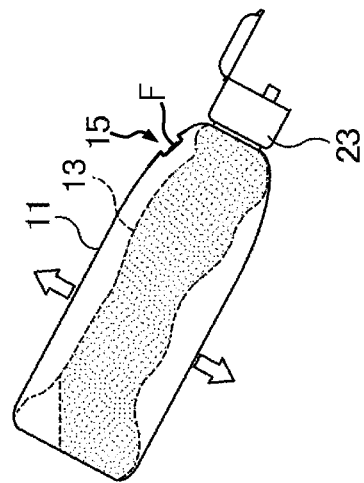

In the cap 23, a check valve not shown is built-in, and allows to discharge the contents in the inner layer 13 but does not allow the external air to be introduced into the inner layer 13. Accordingly, when the compressig force applied to the outer layer 11 is removed after discharging the contents, the outer layer 11 recovers its original shape by its recovering force, while the inner layer 13 stays shrunk. That is, only the layer 11 expands. Then, as shown in FIG. 27D, the pressure in the intermediate space 21 between the inner layer 13 and the outer layer 11 decreases, thereby introducing external air into the intermediate space 21 from the air inlet 15 formed in the outer layer 11. Here, the hydrophobic filter F is fixed to the air inlet 15. The hydrophobic filter F of the present embodiment has a ventilating degree which can allow sufficient ventilation of the external air by the pressure difference between the external air and the internal of the intermediate space 21. Accordingly, the outer layer 11 can be recovered sufficiently.

Figure 27E:
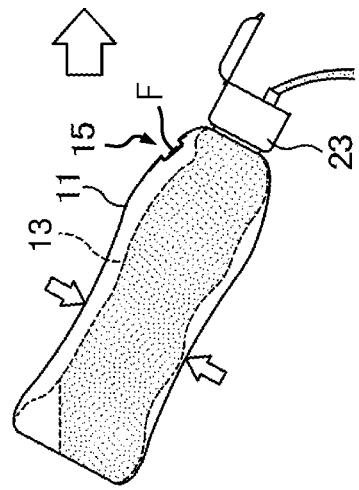
Figure 27D:
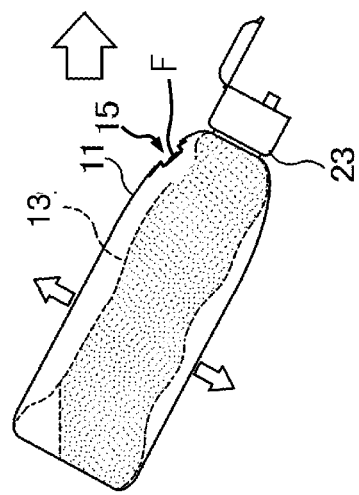

Subsequently, as shown in FIG. 27E, when the side surface of the outer layer 11 is squeezed and compressed again, the pressure in the intermediate space 21 is increased since the hydrophobic filter F has a ventilating degree which does not immediately discharge the air in the intermediate space 21 when the outer layer 11 is compressed. Accordingly, the compressig force applied to the outer layer 11 is transferred to the inner layer 13 via the intermediate space 21, and such force compresses the inner layer 13, resulting in discharge of the contents.

Then, as shown in FIG. 27F, when the compressig force applied to the outer layer 11 is removed after discharging the contents, the outer layer 11 recovers its original shape by its recovering force, while introducing the external air into the intermediate space 21 from the air inlet 15. During such procedure, the outer layer 11 can be recovered sufficiently since the hydrophobic filter F has an appropriate ventilating degree.

The embodiments applied with the present invention have been explained, however, the present invention shall not be limited to these embodiments, and various modification can be made without departing from the gist of the present invention.

Examples

Hereinafter, text examples are given to provide detailed explanation of the present invention. However, the present invention shall not be limited to these test examples. Here, in the tests shown below, the delaminatable container 1 which has a discharge pressure of 1.5 to 2.5 kPa, the discharge pressure being a pressure of the contents discharged from the discharging outlet 23$b$ of the cap 23; and having an effective area of approximately 28 mm$^2$ (diameter of the air inlet 15 being 6 mm), the area being the area of the filter F; is used. The discharge pressure can be measured by fixing a pressure logger within the inner layer 13. The tests were performed for the two items of the discharge characteristics and the recovery characteristics, by fixing a hydrophobic filter F (ventilating membrane) onto the air inlet 15. Here, four hydrophobic filters having the following Gurley numbers respectively, were used.
(Sample 1) 1.5 seconds
(Sample 2) 4 seconds
(Sample 3) 12 seconds
(Sample 4) 35 seconds
<Discharge Characteristics Evaluation Test>

The discharge characteristics evaluation test is a test to evaluate the ability to discharge a small amount. Capability to discharge the contents at 1 ml/1 sec was tested.

The results of the test are shown in Table 1. The test was performed twice for each of the four bottles having different ventilating degrees. Evaluation was performed based on the following criteria.
A: discharge performed without interruption
B: discharge was interruped
<Recovery Characteristics Evaluation Test>

The recovery characteristics evaluation test is a test to evaluate the recovery characteristics of the container (outer layer 11) after being squeezed. The time required for the container to recover after discharging 15 ml of contents (water) was measured.

The results of the tests are shown in Table 1. The tests were performed three times for each of the four bottles having different ventilating degrees. Evaluation was performed based on the following criteria.
A: the bottle recovered by 30 seconds or less in average
B: the bottle recovered in 30 to 60 seconds in average
C: the bottle did not recover even after 60 seconds or more had elapsed in average

TABLE 1

|  | Sample 1 | Sample 2 | Sample 3 | Sample 4 |
|---|---|---|---|---|
| Gurley number | 1.5 sec | 4 sec | 12 sec | 35 sec |
| discharge characteristics | B | A | A | A |
| recovery characteristics | A | A | B | C |

As shown in the test results of Table 1, the smaller the ventilating degree, the more superior the discharge characteristics. On the other hand, the larger the ventilating degree, the more superior the recovery characteristics. From the evaluation results of the afore-mentioned discharge characteristics and recovery characteristics, it was demonstrated that when the delaminatable container 1 which has a discharge pressure of 1.5 to 2.5 kPa, the discharge pressure being a pressure of the contents discharged from the discharging outlet 23$b$ of the cap 23; and having an effective area of approximately 28 mm$^2$ (diameter of the air inlet 15 being 6 mm), the area being the area of the filter F; was used, both of superior discharge characteristics and superior recovery characteristics can be achieved when the Gurley number of the hydrophobic filter F was adjusted to 2.5 to 20 seconds, and both of further superior discharge characteristics and further superior recovery characteristics can be achieved when the Gurley number of the hydrophobic filter F was adjusted to 2.5 to 10 seconds.

Although detailed explanation is omitted, it was demonstrated that when a cap having a check valve which adjusts the discharge pressure to be lower than 1.5 kPa is used, a delaminatable container 1 having a suitable discharge characteristics and a suitable recovery characteristics can be obtained even when a filter F having a Gurley number of 1.5 to 2.5 seconds was used.

The invention claimed is:

1. A delaminatable container comprising an outer shell; an inner bag; and a cap to discharge contents stored in the inner bag, the inner bag shrinking as the contents decrease; wherein:

an air inlet is formed on the outer shell and a filter is arranged to block the air inlet; and a combination of Gurley number of the filter, area of the filter, and discharge pressure of the cap is selected so that an amount of air leakage through the filter represented by the following equation would be 0.5 ml/sec to 2.4 ml/sec amount of air leakage(ml/sec)=100 (ml)/Gurley number(sec)×area of filter(mm$^2$)/642 (mm$^2$)×discharge pressure(kPa)/1.23 (kPa).

2. The delaminatable container of claim 1, wherein the Gurley number is 2.5 to 10 seconds.

3. The delaminatable container of claim 1, wherein the filter is a hydrophobic filter which allows permeation of air and blocks water.

4. The delaminatable container of claim 3, wherein the hydrophobic filter is a lamination of a hydrophobic microporous membrane and a nonwoven fabric.

5. The delaminatable container of claim 4, wherein the hydrophobic filter is subjected to ultrasonic sealing in a direction where the outer shell is in contact with the nonwoven fabric.

\* \* \* \* \*